(12) United States Patent
Volkerink et al.

(10) Patent No.: US 12,141,763 B2
(45) Date of Patent: Nov. 12, 2024

(54) RECYCLING ASSETS INCORPORATING WIRELESS TAGS

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 766 days.

(21) Appl. No.: 17/086,696

(22) Filed: Nov. 2, 2020

(65) Prior Publication Data
US 2021/0133696 A1 May 6, 2021

Related U.S. Application Data

(60) Provisional application No. 62/929,102, filed on Nov. 1, 2019.

(51) Int. Cl.
*G06Q 10/30* (2023.01)
*G06K 19/07* (2006.01)
*G06Q 10/0833* (2023.01)
*H04W 4/029* (2018.01)

(52) U.S. Cl.
CPC ......... *G06Q 10/30* (2013.01); *G06K 19/0704* (2013.01); *G06K 19/0706* (2013.01); *G06K 19/0723* (2013.01); *G06Q 10/0833* (2013.01); *H04W 4/029* (2018.02)

(58) Field of Classification Search
CPC ... G06Q 10/30; G06Q 10/0833; H04W 4/029; G06K 19/0704; G06K 19/0706; G06K 19/0723
USPC .................................................. 705/308
See application file for complete search history.

(56) References Cited

U.S. PATENT DOCUMENTS

| | | |
|---|---|---|
| 7,783,380 B2 | 8/2010 | York et al. |
| 10,438,162 B2 | 10/2019 | Sharma et al. |
| 10,445,756 B2 | 10/2019 | Gonen et al. |
| 2002/0056669 A1 | 5/2002 | Pratt et al. |
| 2002/0134497 A1 | 9/2002 | Roth |
| 2004/0039424 A1 | 2/2004 | Merritt et al. |
| 2006/0033475 A1 | 2/2006 | Moore |

(Continued)

FOREIGN PATENT DOCUMENTS

CA      2507385 A1      11/2005

OTHER PUBLICATIONS

International Patent Application No. PCT/US2022/032024 International Search Report and Written Opinion dated Aug. 19, 2022, 15 pages.

(Continued)

*Primary Examiner* — Daniel A Hess

(57) ABSTRACT

A wireless tracking system for tracking and monitoring assets is disclosed herein. The wireless tracking system comprises wireless tags. A wireless tag is configured to track a respective asset during delivery to a shipping address. After the asset has arrived at the shipping address, the wireless tag is released to a delivery service to be delivered to the return address for recycling or renovating an electronic component of the wireless tag, e.g., by wired or wirelessly recharging the energy source. In some embodiments, the wireless tracking system remotely monitors a performance level of the energy source via a wireless communication with the wireless tag and, responsive to the performance level of the energy source being below a threshold level, transmits a notification to a user of the wireless tracking system to ship the wireless tag to the return address for renovation or recycling.

19 Claims, 18 Drawing Sheets

(56) References Cited

U.S. PATENT DOCUMENTS

| | | |
|---|---|---|
| 2006/0080819 A1 | 4/2006 | McAllister |
| 2006/0236761 A1 | 10/2006 | Inoue et al. |
| 2007/0118549 A1 | 5/2007 | Bornhoevd et al. |
| 2007/0262861 A1 | 11/2007 | Anderson et al. |
| 2009/0014528 A1 | 1/2009 | Gelbman |
| 2009/0266722 A1 | 10/2009 | Rogers et al. |
| 2010/0318553 A1 | 12/2010 | Pirtle et al. |
| 2010/0324959 A1 | 12/2010 | Templeton et al. |
| 2012/0150754 A1 | 6/2012 | Belady et al. |
| 2012/0210325 A1 | 8/2012 | De Lind Van Wijngaarden et al. |
| 2012/0303498 A1 | 11/2012 | Cova et al. |
| 2013/0314233 A1 | 11/2013 | Stevens |
| 2015/0256008 A1 | 9/2015 | Miller et al. |
| 2016/0054448 A1 | 2/2016 | Woolf et al. |
| 2016/0261122 A1 | 9/2016 | Childress et al. |
| 2016/0277884 A1 | 9/2016 | Ehrman et al. |
| 2016/0333226 A1 | 11/2016 | Jo |
| 2018/0052462 A1 | 2/2018 | Arena |
| 2018/0113500 A1 | 4/2018 | Loeffler et al. |
| 2019/0115630 A1 | 4/2019 | Roohparvar et al. |
| 2019/0222055 A1 | 7/2019 | Khoche et al. |
| 2019/0303862 A1 | 10/2019 | Bollinger et al. |
| 2019/0362215 A1 | 11/2019 | Khoche |
| 2020/0092681 A1 | 3/2020 | Shapiro et al. |
| 2020/0143322 A1 | 5/2020 | Dearing |
| 2020/0265288 A1 | 8/2020 | Volkerink et al. |

OTHER PUBLICATIONS

International Patent Application No. PCT/US2021/062239 International Search Report and Written Opinion dated Mar. 29, 2022, 18 pages.

Envio, https://web.archive.org/web/20200922114250/https:/www.envio.io/digital-shipping-label, accessed Dec. 7, 2022, 5 pages.

International Patent Application No. PCT/US2021/053434, International Search Report and Written Opinion dated Feb. 7, 2022, 10 pages.

PCT International Search Report, International Application No. PCT/US2020/058493. International search completed Jan. 4, 2021. International Search Report mailed Feb. 2, 2021. pp. 1-2.

PCT Written Opinion of the International Search Authority, International Application No. PCT/US2020/058493. Date of completion Jan. 4, 2021. Written Opinion mailed Feb. 2, 2021. pp. 1-8.

Extended European Search Reportfor European Patent Application No. 20881060.6, dated Nov. 17, 2023. 7 Pages.

Examination Search Report for Canadian Patent Application No. 3,156,765, dated Dec. 22, 2022. 4 Pages.

RECYCLING ASSETS INCORPORATING WIRELESS TAGS

BACKGROUND

The present disclosure claims priority to U.S. Provisional Patent Application No. 62/929,102, filed Nov. 1, 2019, which is incorporated herein in its entirety.

FIELD OF THE DISCLOSURE

The disclosure generally relates to wireless sensor tags and communications devices and systems for tracking and monitoring assets.

BACKGROUND

Battery operated devices used in tracking and monitoring assets may run out of energy unexpectedly while in the field if not regularly maintained or charged, particularly when the devices are used for multiple shipments or multiple stage shipments. Operations of the devices, such as collecting and storing sensor data, communicating with other devices, and the like, are frequently reliant on batteries to function. As such, loss of battery life in the devices may result in damages to the tracking, handling, or delivery of assets.

SUMMARY

In an aspect, a wireless tracking system enables the recycling and renovation of electronic devices used for tracking and monitoring wireless tags on assets. Assets may be, for example, packages or other items being transported or shipped between two or more locations. Wireless tags comprise a back side, a front side, and one or more electronic components between the back side and the front side of the wireless tag. In an embodiment, the back side of the wireless tag comprises a shipping address and a return address. The front side of the wireless tag comprises instructions to remove the wireless tag from a sleeve on an asset and to reinsert the wireless tag into the sleeve such that the back side of the wireless tag is visible through the sleeve before releasing the asset to a delivery or transport service. The one or more electronic components comprise, in an embodiment, an antenna, a wireless communication system coupled to the antenna, one or more sensors operable to generate data characterizing an environmental state of the asset in response to exposure to external stimulus, a processor, an energy source, and one or more instructions that, when executed by the processor, causes the processor to perform operations comprising processing the data, storing the processed data, and controlling the wireless communications system to transmit wireless messages to the wireless tracking system.

In an embodiment, the energy source for the electronic components is a rechargeable battery. For example, the rechargeable battery comprises terminals that connect to an external power source through a wired connection. In another example, the rechargeable battery comprises an internal radio frequency energy receiver that converts received external radio frequency energy into electrical energy. In another example, the rechargeable battery is a separate modular component configured to attach to and detach from one or more electronic components of the asset.

In an embodiment, the processor performs operations comprising transmitting wireless messages to a server or another wireless tag of the wireless tracking system, the wireless message comprising information describing a charge level of the energy source of the wireless tag and a unique identifier of the wireless tag, such that the wireless tracking system is able to identify when the charge level of the wireless tag is below a threshold level. In some embodiments, responsive to the charge level of the wireless tag being below a threshold level, the wireless tracking system transmits a notification or message to a user of the wireless tracking system to perform an action to renovate or recycle the energy source, e.g., shipping the wireless tag to a return address for recharging.

In an embodiment, the front side of the wireless tag further comprises a pictogram depicting a series of steps for removing the wireless tag from the sleeve and reinserting the asset into the sleeve so that the back side of the wireless tag is visible through the sleeve. In other embodiments, other written or drawn instructions may be included on the front side of the wireless tag. In some embodiments, instructions may additionally or instead be included on the back side of the wireless tag.

In an embodiment, the one or more sensors of the wireless tag comprise one or more of: a Global Positioning Satellite (GPS) sensor, an accelerometer, a temperature probe, a vibration sensor, an acoustic sensor, a photoelectric sensor, or the like.

In an embodiment, the wireless tag comprises a rectangular form factor. In other embodiments, the wireless tag may comprise other form factors, e.g., irregular or specialized form factors. In some embodiments, the wireless tag further comprises a first adhesive layer between the front side of the wireless tag and the rechargeable battery, and a second adhesive layer between the rechargeable battery and the back side of the wireless tag. In some embodiments, a bill of lading is enclosed within the sleeve. In other embodiments, other items may be additionally or instead enclosed within the sleeve.

In an aspect, a method for recycling a wireless tag is additionally disclosed herein. A wireless tracking system tracks an asset carrying or associated with a wireless tag. In some embodiments, for example, the asset is received at the shipping address by a delivery or transport service. The wireless tag comprises a back side having a shipping address and a return address facing outwardly, such that the back side of the wireless tag is visible through a sleeve attached to the package. The wireless tag further comprises a front side having instructions to remove the wireless tag from a sleeve on the asset and to reinsert the wireless tag into the sleeve such that the back side of the wireless tag is visible through the sleeve before releasing the asset to a delivery or transport service. The asset further comprises a rechargeable battery or other electronic component. The rechargeable battery and/or one or more other electronic components is renovated, recycled, or recharged, and may be incorporated with another wireless tag or another asset.

In some embodiments, the renovating comprises recharging the rechargeable battery. For example, the rechargeable battery may be charged wirelessly. In another example, the rechargeable battery may be charged using electrical energy converted from a radio frequency energy converter that converts received external radio frequency energy into electrical energy. In another example, the rechargeable battery may be charged by connecting an external power source to terminals of the rechargeable battery through a wired connection. In another embodiment, the renovating comprises attaching a separate modular component comprising a charged rechargeable battery that is configured to attach to and detach from one or more electrical components of the asset.

In conventional methods of asset tracking, tracking devices or components of tracking devices may be recycled or reused between assets, deliveries, and the like. However, because conventional tracking devices are bulky, larger, and heavier than wireless tags, methods and costs for shipping conventional tracking devices to locations for recycling or reuse are often prohibitive. In particular, aggregating large amounts of conventional tracking devices frequently requires large pallets, machinery, or otherwise exceeds available or convenient space. Additionally, the weight of conventional tracking devices demands high costs of shipping. The system and methods disclosed herein address these and other concerns.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

Figure 1A:
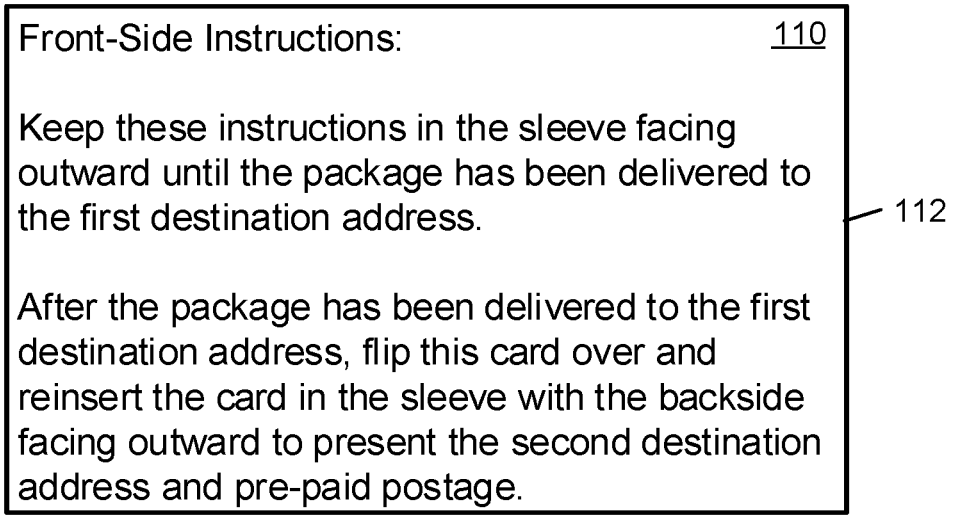
FIG. 1A is a schematic diagram of a front side of an embodiment of a wireless tag for multiple shipment stages.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

DETAILED DESCRIPTION

Introduction

The present invention is not limited in any way to the embodiments described herein. Instead, the embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof. The term "metadata" include information about data objects or characteristics thereof. The terms "module," "manager," and "unit" refer to hardware, software, or firmware, or a combination thereof.

The terms "wireless tag," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, example, as an adhesive tape, label, sticker, decal, a card, a wireless tag, a tracking device, or the like, and as a wireless communications device. A "peripheral" tape node or wireless node, also referred to as an outer node, leaf node, or terminal node, refers to a node that does not have any child nodes.

In certain contexts, the terms "wireless tracking system," "hierarchical communications network," "distributed agent operating system," and the like are used interchangeably herein to refer to a system or network of wireless nodes.

Transport of Assets with Wireless Tags

Embodiments described herein relate to shipping and recycling assets that incorporate wireless tags for tracking and monitoring the assets. Each shipment is carried out in two stages: a first stage in which an asset is shipped to a primary destination address by a first delivery service (e.g., US Postal Service, United Parcel Service, and Federal Express); and a second stage in which a wireless tag is shipped to a renovation or recycling facility by a second delivery service (e.g., US Postal Service, United Parcel Service, and Federal Express). The wireless tag also is shipped to a recycling facility for renovation or recycling by a delivery service in response to a determination that the charge storage component of a wireless tag falls below a charge level threshold.

FIG. 1A is a schematic diagram of a front side 110 of an embodiment of a wireless tag 112. In the illustrated embodiment, the wireless tag 112 has a form factor that is similar in size and/or in shape to the form factor of a business card or a postcard, e.g., is square, rectangular, or regular in shape. In other embodiments not shown in FIG. 1A, the wireless tag 112 may have alternative form factors. For example, form factors may comprise irregular or specialized form factors such as a luggage tag form factor wherein the wireless tag is able to be wound around a portion of an asset and adhered to itself. In another example, the form factor may be specialized to be adhered to a particular asset, e.g., to a narrow or irregular portion of an asset. In other examples, the form factor of the wireless tag is that of an adhesive tape, having one or more adhesive surfaces or adhesive portions of surfaces. In other examples, the form factor may be smaller (e.g., so as to fit into narrow or tight areas of an asset) or larger (e.g., so as to be clearly visible on large assets), and may comprise additional or different mechanisms for adhering or affixing to assets.

In some embodiments, the form factor is a flexible adhesive tape platform comprising a flexible polymer layer encapsulating one or more electronic components (as discussed further in FIG. 5) of the wireless tag, so as to enable the application of bending, torqueing, pressing, or other forces that may be applied to the flexible adhesive tape platform. For example, as in the luggage tag form factor, the flexible form factor may be bent along an axis to adhere to itself, e.g., around a wire, cord, lever, or handle of an asset. The flexible adhesive tape platform may further comprise one or more flexible film layers having reflective surfaces or reflective surface coatings and/or paper substrates. Example compositions for flexible film layers include polymer films, such as polyester, polyimide, polyethylene terephthalate (PET), and other plastics. The flexible adhesive tape platform may further comprise one or more pressure-sensitive (e.g., silicon-based) adhesive layers or flexible epoxy layers. In other examples, other compositions and layers may be used, e.g., insulating layers or materials, colored layers or materials, light-reflective layers or materials, light-absorbing layers or materials, and/or light-emitting coatings, layers, or materials. In some embodiments, one or more layers of the form factor are adhered together, e.g., the form factor comprises a first adhesive layer between a front side of the wireless tag and a rechargeable battery or other energy source, and further comprises a second adhesive layer between the rechargeable battery or other energy source and the back side of the wireless tag.

In some embodiments, one or more layers or components of the form factor may be rigid such that the adhesive tape platform is fully rigid or rigid along one or more axes. In some embodiments, the form factor may comprise modules or portions that are mechanically or chemically affixed or adhered together and may be removeable, e.g., a removeable battery module as further discussed in conjunction with FIGS. 14A-14C.

The front side 110 of the wireless tag 112 includes text instructions to orient the wireless tag 112 with the front-side text instructions facing outward during the first shipment stage. In particular, the front-side instructions indicate that the front side 110 of the wireless tag 112 should remain facing outward until the asset has been delivered to the first destination address. In some embodiments, the front side of the wireless tag additionally or instead comprises pictograms depicting a series of steps for removing the asset from the sleeve and reinserting the asset into the sleeve such that the back side of the asset is visible through the sleeve, as discussed further in conjunction with FIG. 2. During the first shipment stage, the wireless tag performs tracking and sensing tasks, such as, monitoring the location and state of the wireless tag and its environment, and wirelessly reporting the status of the wireless tag.

Figure 1B:
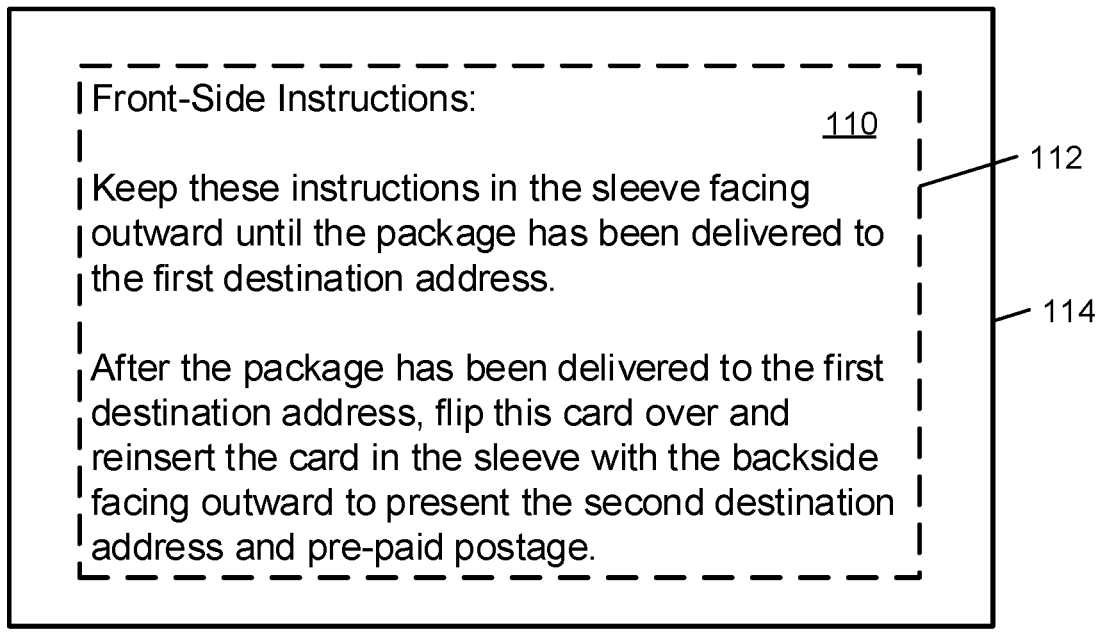
FIG. 1B is a schematic diagram of an example of the backside of an embodiment of a wireless tag.

As shown in FIG. 1B, in some embodiments, the wireless tag 112 is carried in a sleeve 114 with a transparent front side and back side that is attached to the asset. In the illustrated embodiment, the instructions on the front side 110 of the wireless tag 112 are visible through the front side of the sleeve. In some embodiments, the sleeve may further be used to carry additional items relevant to the asset. For example, the sleeve may be used to carry a bill of lading, an invoice, or other information relevant to the asset.

Figure 1C:
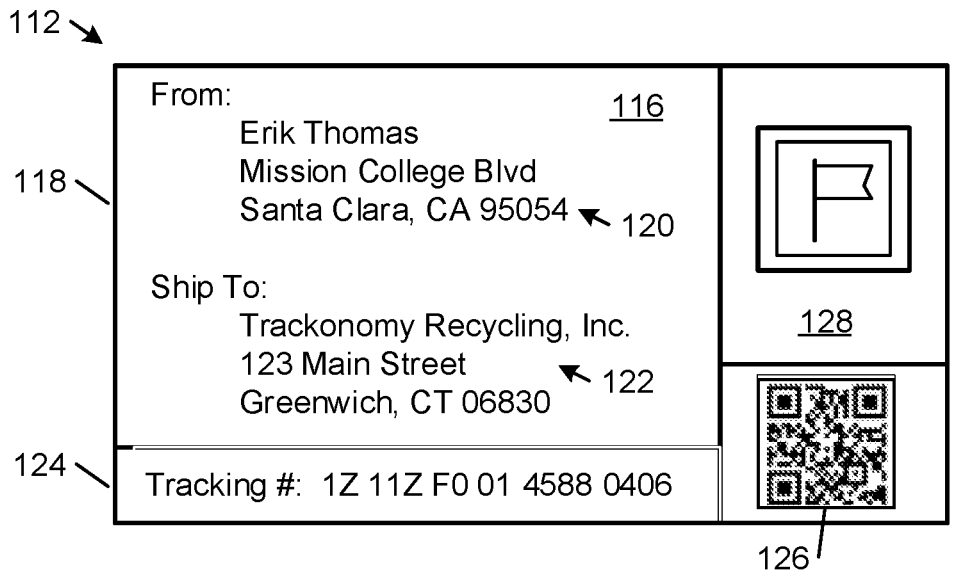
FIG. 1C is a schematic diagram of the wireless tag depicted in FIG. 1B within a sleeve with a transparent front side.

FIG. 1C shows an example of the back side 116 of the wireless tag 112. The back side of the wireless tag 112 has an address section 118 that includes a source address 120 and a destination (or shipping) address 122. The wireless tag 112 also includes a tracking number section 124, a barcode section 126, and a postage section 128.

Figure 2:
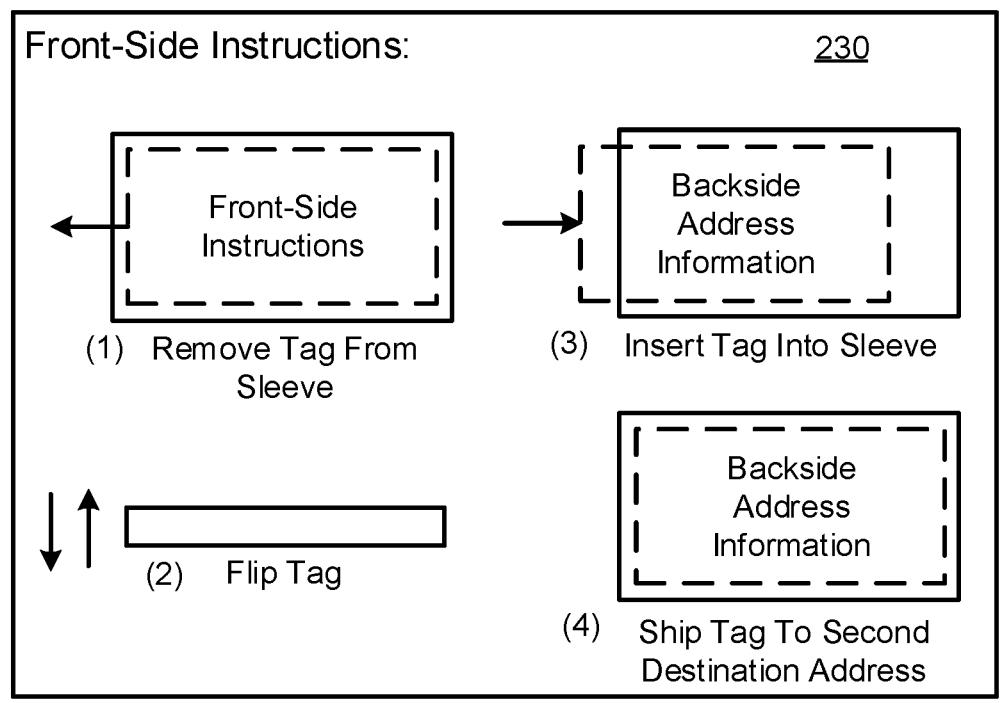
FIG. 2 is a schematic diagram of a front side of an embodiment of a wireless tag that includes a pictogram depicting instructions for configuring the orientation of the wireless tag during multiple shipment stages.

FIG. 2 is a schematic diagram of a front side of an embodiment of a wireless tag that includes a pictogram depicting front-side instructions 230 for configuring the orientation of the wireless tag during the transition between two shipment stages. In particular, after an asset is shipped to a primary destination address by a first delivery service (e.g., US Postal Service, United Parcel Service, and Federal Express), the second stage involves: (1) removing the wireless tag 112 from the sleeve (if present); (2) flipping the tag 112 over to reveal the address information; (3) inserting the wireless tag 112 into the sleeve 114 with the backside of the wireless tag 112 facing out through the sleeve; and (4) by a second delivery service (e.g., US Postal Service, United Parcel Service, and Federal Express), shipping the wireless tag 112 to the second destination address, which may be a renovation or recycling facility.

Adhesive Tape Platform

In some embodiments, the wireless tag 112 has an adhesive tape form factor, wherein the wireless tag may function as both a wireless communication device and as an adhesive tape. The wireless tag with the adhesive tape form factor may be referred to herein as an "adhesive tape platform."

Figure 3A:
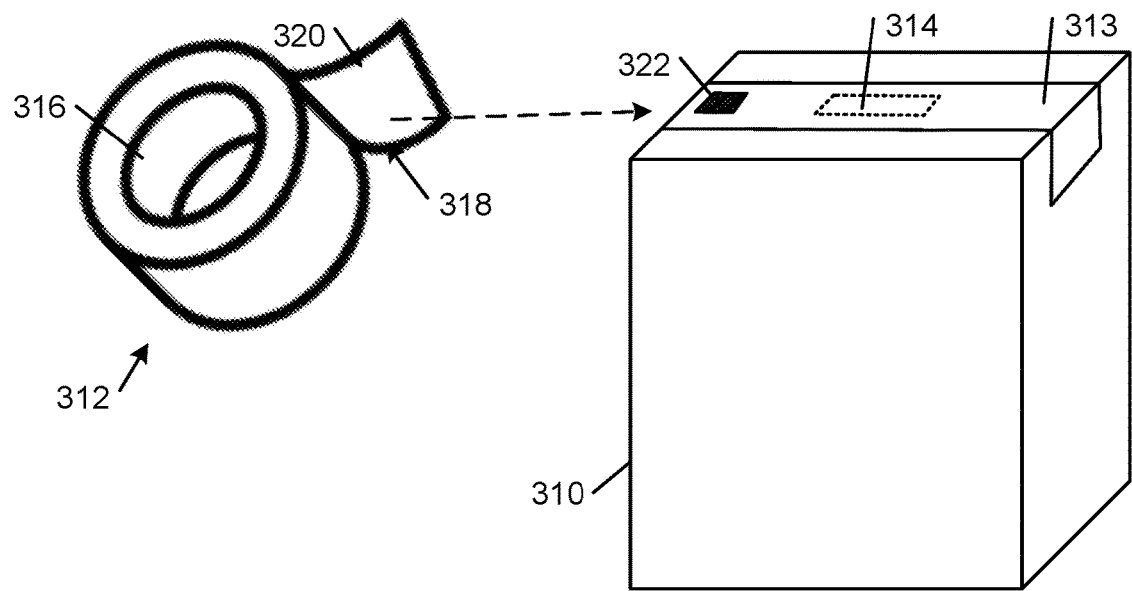
FIG. 3A is a diagrammatic view of an asset that has been sealed for shipment using a segment of an example adhesive tape platform dispensed from a roll.

FIG. 3A shows an example asset 310 that is sealed for shipment using an example adhesive tape platform 312 that includes embedded components of a wireless transducing circuit 314. In this example, a segment 313 of the adhesive tape platform 312 is dispensed from a roll 316 and affixed to the asset 310. The adhesive tape platform 312 includes an adhesive side 318 and a non-adhesive side 320. The adhesive tape platform 312 can be dispensed from the roll 316 in the same way as any conventional packing tape, shipping tape, or duct tape. For example, the adhesive tape platform 312 may be dispensed from the roll 316 by hand, laid across the seam where the two top flaps of the asset 310 meet, and cut to a suitable length either by hand or using a cutting instrument (e.g., scissors or an automated or manual tape dispenser). Examples of such tapes include tapes having non-adhesive sides 320 that carry one or more coatings or layers (e.g., colored, light reflective, light absorbing, and/or light emitting coatings or layers).

Figure 3B:
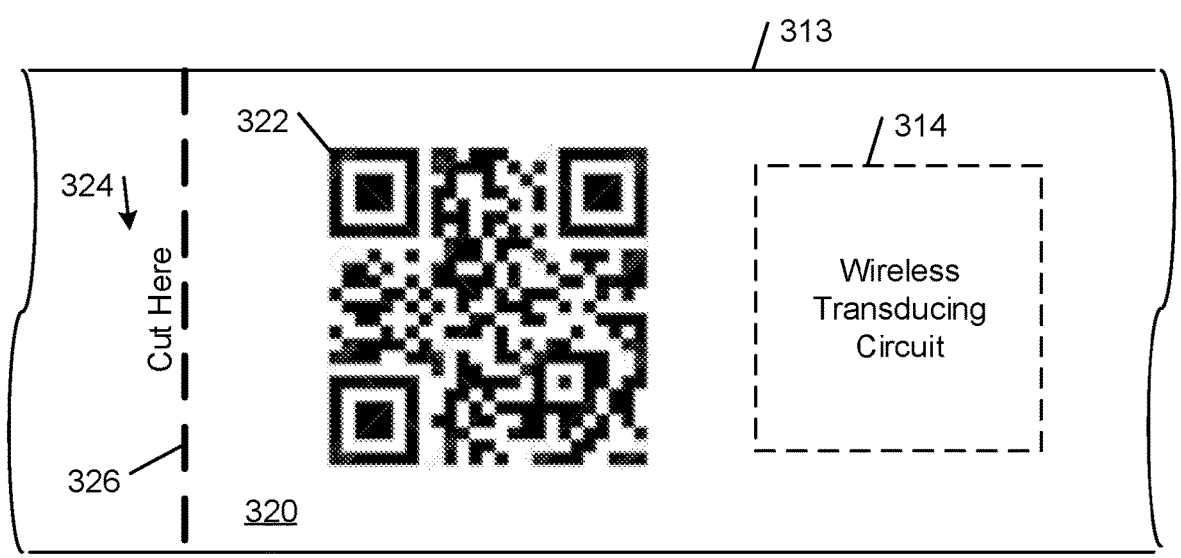
FIG. 3B is a diagrammatic top view of a portion of the segment of the example adhesive tape platform shown in FIG. 3A.

Referring to FIG. 3B, in some examples, the non-adhesive side 320 of the length 313 of the adhesive tape platform 312 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the segment 313 of the adhesive tape platform 312 includes a two-dimensional bar code (e.g., a QR Code) 322, written instructions 324 (i.e., "Cut Here"), and an associated cut line 326 that indicates where the user should cut the adhesive tape platform 312. The written instructions 324 and the cut line 326 typically are printed or otherwise marked on the top non-adhesive surface 320 of the adhesive tape platform 312 during manufacture. The two-dimensional bar code 322, on the other hand, may be marked on the non-adhesive surface 320 of the adhesive tape platform 312 during the manufacture of the adhesive product 312 or, alternatively, may be marked on the non-adhesive surface 320 of the adhesive tape platform 312 as needed using, for example, a printer or other marking device.

The non-adhesive side 320 may also include the instructions for recycling or renewing the segment 313 of the adhesive tape platform 312, such as the instructions shown in FIGS. 1A and 1B and/or the instructions 230 shown in FIG. 2. In further embodiments, the non-adhesive side may also include information, such as those shown in FIG. 1C. In some embodiments, the adhesive side 318 may include instructions (e.g., the instructions 230 or the instructions in FIGS. 1A and 1B) printed on a surface of the adhesive side 318.

In order to avoid damage to the functionality of the segments of the adhesive tape platform 312, the cut lines 326 typically demarcate the boundaries between adjacent segments at locations that are free of any active components of the wireless transducing circuit 314. The spacing between the wireless transducing circuit components 314 and the cut lines 326 may vary depending on the intended communication, transducing and/or adhesive taping application. In the example illustrated in FIG. 3A, the length of the adhesive tape platform 312 that is dispensed to seal the asset 310 corresponds to a single segment of the adhesive tape platform 312. In other examples, the length of the adhesive tape platform 312 needed to seal a asset or otherwise serve the adhesive function for which the adhesive tape platform 312 is being applied may include multiple segments 313 of the adhesive tape platform 312, one or more of which segments 313 may be activated upon cutting the length of the adhesive tape platform 312 from the roll 316 and/or applying the length of the adhesive tape platform to the asset 310.

In some examples, the transducing components 314 that are embedded in one or more segments 313 of the adhesive tape platform 312 are activated when the adhesive tape platform 312 is cut along the cut line 326. In these examples, the adhesive tape platform 312 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 314 in one or more segments of the adhesive tape platform 312 in response to being separated from the adhesive tape platform 312 (e.g., along the cut line 326).

In some examples, each segment 313 of the adhesive tape platform 312 includes its own respective energy source including energy harvesting elements that can harvest energy from the environment. In some of these examples, each energy source is configured to only supply power to the components in its respective adhesive tape platform segment regardless of the number of contiguous segments 313 that are in a given length of the adhesive tape platform 312. In other examples, when a given length of the adhesive tape platform 312 includes multiple segments 313, the energy sources in the respective segments 313 are configured to supply power to the transducing components 314 in all of the segments 313 in the given length of the adhesive tape platform 312. In some of these examples, the energy sources are connected in parallel and concurrently activated to power the transducing components 314 in all of the segments 313 at the same time. In other examples, the energy sources are connected in parallel and alternately activated to power the transducing components 314 in respective ones of the adhesive tape platform segments 313 at different time periods, which may or may not overlap.

Figure 4:
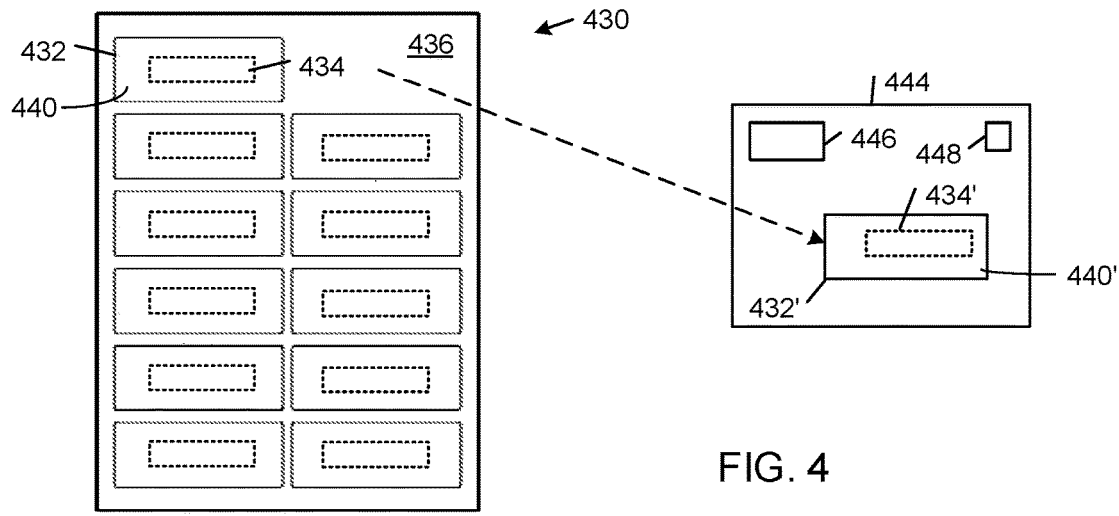
FIG. 4 is a diagrammatic view of an example of an envelope carrying a segment of an example adhesive tape platform dispensed from a backing sheet.

FIG. 4 shows an example adhesive tape platform 430 that includes a set of adhesive tape platform segments 432 each of which includes a respective set of embedded wireless transducing circuit components 434, and a backing sheet 436 with a release coating that prevents the adhesive segments 432 from adhering strongly to the backing sheet 436. Each adhesive tape platform segment 432 includes an adhesive side facing the backing sheet 436, and an opposing non-adhesive side 440. In this example, a particular segment 432' of the adhesive tape platform 430 has been removed from the backing sheet 436 and affixed to an envelope 444. Each segment 432 of the adhesive tape platform 430 can be removed from the backing sheet 436 in the same way that adhesive labels can be removed from a conventional sheet of adhesive labels (e.g., by manually peeling a segment 432 from the backing sheet 436). In general, the non-adhesive side 440' of the segment 432' may include any type of writing, markings, decorative designs, or other ornamentation. In the illustrated example, the non-adhesive side 440' of the segment 432' includes writing or other markings that correspond to a destination address for the envelope 444. The envelope 444 also includes a return address 446 and, optionally, a postage stamp or mark 448.

In some examples, segments of the adhesive tape platform 312 are deployed by a human operator. The human operator may be equipped with a mobile phone or other device that allows the operator to authenticate and initialize the adhesive tape platform 312. In addition, the operator can take a picture of an asset including the adhesive tape platform and any barcodes associated with the asset and, thereby, create a persistent record that links the adhesive tape platform 312 to the asset. In addition, the human operator typically will send the picture to a network service and/or transmit the picture to the adhesive tape platform 312 for storage in a memory component of the adhesive tape platform 312.

In some examples, the wireless transducing circuit components 434 that are embedded in a segment 432 of the adhesive tape platform 312 are activated when the segment 432 is removed from the backing sheet 436. In some of these examples, each segment 432 includes an embedded capacitive sensing system that can sense a change in capacitance when the segment 432 is removed from the backing sheet 436. As explained in detail below, a segment 432 of the adhesive tape platform 430 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 434 in the segment 432 in response to the detection of a change in capacitance between the segment 432 and the backing sheet 436 as a result of removing the segment 432 from the backing sheet 436.

Figure 5:
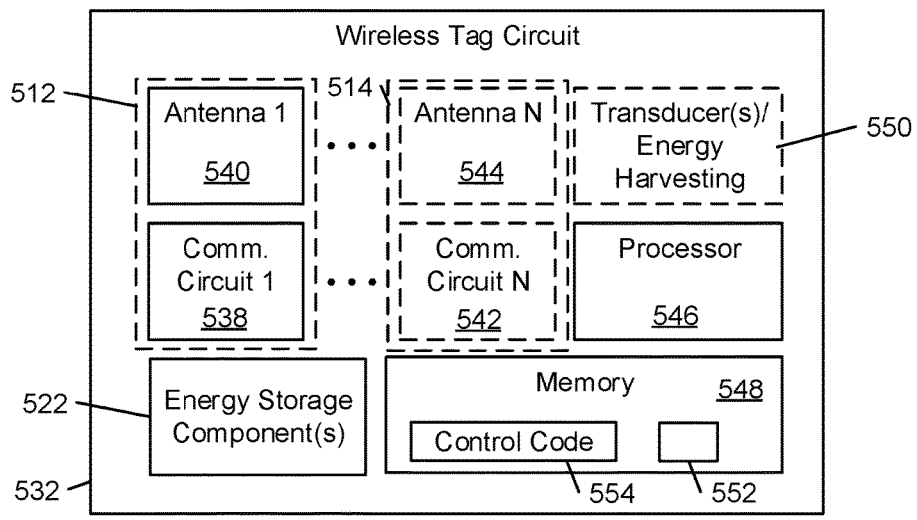
FIG. 5 is a schematic view of an example wireless transducer circuit.

FIG. 5 shows a block diagram of the components of an example wireless tag circuit 532 that includes one or more communication systems 512, 514 The wireless tag 112 incudes the wireless tag circuit 532, according to some embodiments. The wireless tag circuit 532 is disposed between the front side 110 of the wireless tag 112 and the back side 116 of the wireless tag 112. The wireless transducing components 434 and the wireless transducing circuit 314 may also include embodiments of the wireless tag circuit 532. Example communication systems 512, 514 include a GPS system that includes a GPS receiver circuit 538 (e.g., a receiver integrated circuit) and a GPS antenna 540, and one or more wireless communication systems each of which includes a respective transceiver circuit 542 (e.g., a transceiver integrated circuit) and a respective antenna 544. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless tag circuit 532 also includes a processor 546 (e.g., a microcontroller or microprocessor), one or more energy storage devices 548 (e.g., non-rechargeable or rechargeable printed flexible battery, conventional single or multiple cell battery, and/or a super capacitor or charge pump), one or more transducers 550 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the wireless tag circuit 532.

Examples of sensing transducers 550 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 550 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless tag circuit 532 includes a memory 548 for storing data, including, e.g., profile data, state data, event data, sensor data, localization data, security data, and one or more unique identifiers (IDs) 552 associated with the wireless transducing circuit 314, such as a product ID, a type ID, and a media access control (MAC) ID, and control code 554 that includes instructions executable by the processor 546 to perform one or more autonomous agent tasks. In some examples, the memory 548 may be incorporated into one or more of the processors 546 or transducers 550, or may be a separate component that is integrated in the wireless tag circuit 532 as shown in FIG. 5. The control code 554 typically is implemented as programmatic functions or program modules that control the operation of the wireless tag circuit 532, including a node communication manager that manages the manner and timing of tape node communications, a node power manager that manages power consumption, and a node connection manager that controls whether connections with other nodes are secure connections (e.g., connections secured by public key cryptography) or unsecure connections, and a node storage manager that securely manages the local data storage on the wireless tag circuit 532. In some examples, a node connection manager (not shown) ensures the level of security required by the end application and supports various encryption mechanisms. In some examples, a node power manager and communication manager (not shown) work together to optimize the battery consumption for data communication. In some examples, execution of the control code by the different types of nodes described herein may result in the performance of similar or different functions.

Figure 6:
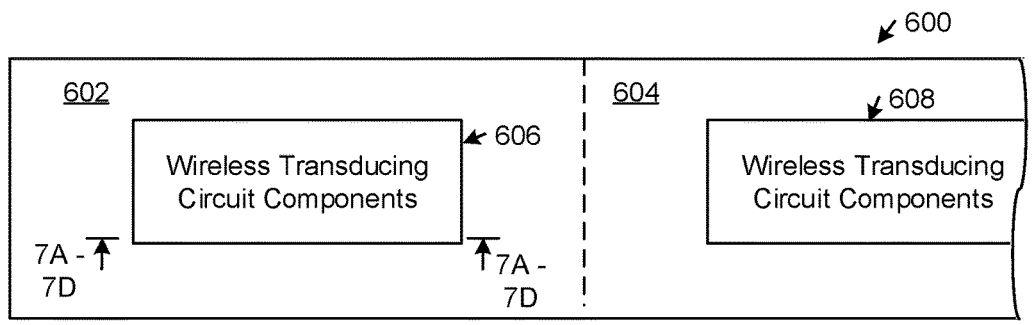
FIG. 6 is a diagrammatic top view of a length of an example autonomous agent platform containing an embedded wireless transducing circuit.

FIG. 6 is a top view of a portion of an example of multiple wireless tags that form a continuous strip of wireless tags 600, including a first segment 602 and a portion of a second segment 604. Each segment 602, 604 of the continuous strip of wireless tags 600 is an individual wireless tag or node and includes a respective set 606, 608 of the components of the wireless tag circuit 532. For example, the segment 602 may be separated (e.g., by cutting the continuous strip of wireless tags 600 along the dotted line shown in FIG. 6). The separated segment 602 may be an embodiment of the wireless tag 112 or an embodiment of the segment 313.

The segments 602, 604 and their respective sets of components 606, 608 typically are identical and configured in the same way. In some other embodiments, however, the segments 602, 604 and/or their respective sets of components 606, 608 are different and/or configured in different ways. For example, in some examples, different sets of the segments of the flexible adhesive tape platform 600 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the continuous strip of wireless tags 600 (see FIG. 6) according to a roll-to-roll fabrication process is described in connection with FIGS. 6, 7A, and 14B of U.S. patent application Ser. No. 15/842,861, filed Dec. 14, 2017, the entirety of which is incorporated herein by reference.

The instant specification describes an example system of wireless tags and adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Deployment of Tape Nodes

Figure 7:
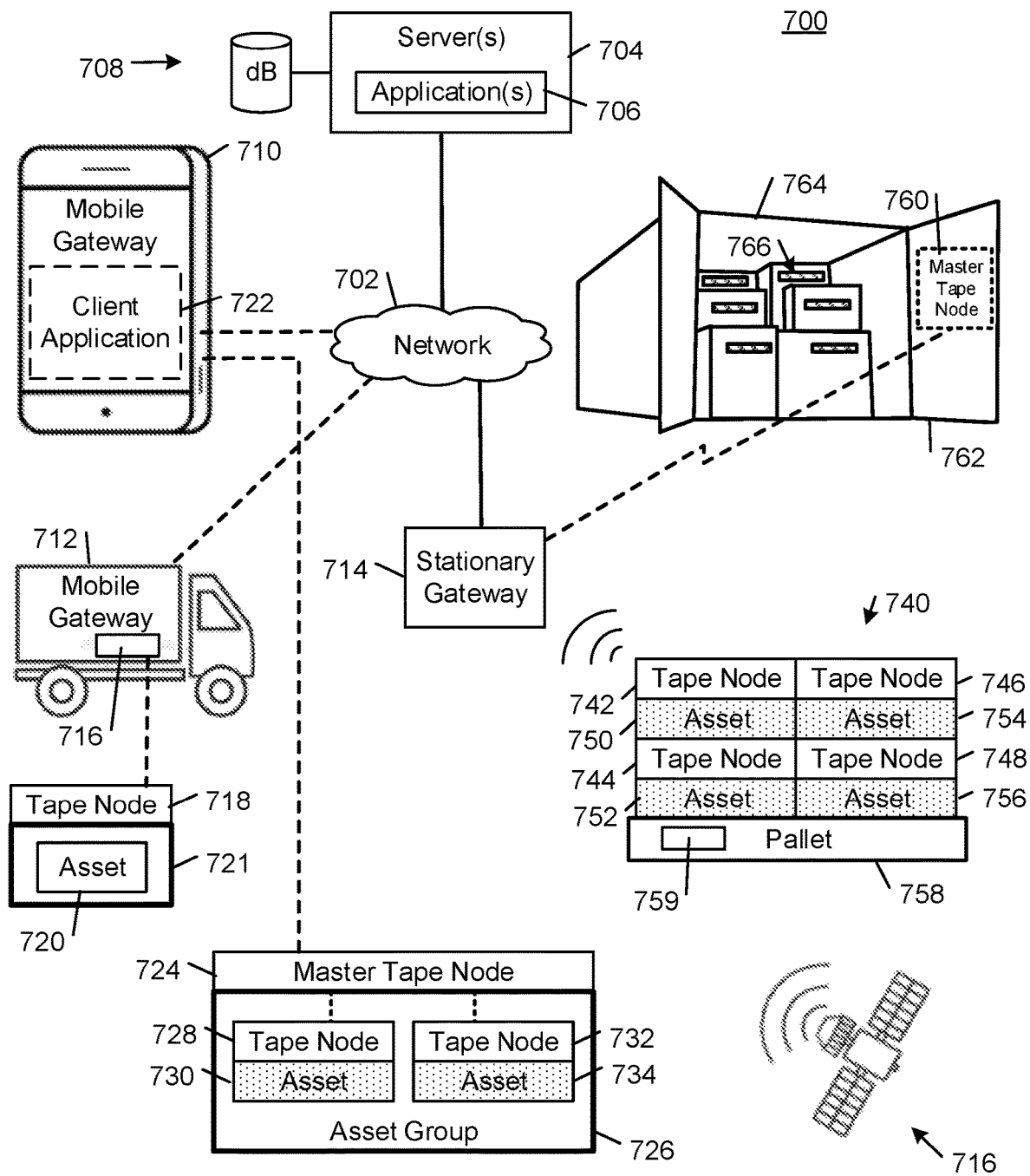
FIG. 7 is a diagrammatic view of an example of a network environment supporting communications with segments of an adhesive tape platform.

FIG. 7 shows an example network communications environment 700 that includes a network 702 that supports communications between one or more servers 704 executing one or more applications of a network service 708, mobile gateways 710, 712, a stationary gateway 714, and various types of tape nodes that are associated with various assets (e.g., parcels, equipment, tools, persons, and other things). The example network communication environment 700 may also be referred to as a wireless tracking system 700. The nodes of the wireless tracking system 700 may refer to the wireless tags, the tape nodes, other wireless devices, the gateway devices, client devices, servers, and other components of the wireless tracking system 700. In some examples, the network 702 includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a geolocation satellite system 716 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 706 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of wireless tags (i.e., tape nodes) can be configured by the network service 708 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

In some examples, the one or more network service servers 704 communicate over the network 702 with one or more gateways that are configured to send, transmit, forward, or relay messages to the network 702 and activated tape nodes that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated set of tape nodes, including a peripheral tape node 718 in the form of a label that is adhered to an asset 720 contained within a parcel 721 (e.g., an envelope), and is further configured to communicate with the network service 708 over the network 702. In some examples, the peripheral tape node 718 includes a lower power wireless communications interface of the type used in, e.g., tape node 602 (shown in FIG. 6), and the wireless communications unit 716 is implemented by a tape node that includes a lower power communications interface for communicating with tape nodes within range of the mobile gateway 712 and a higher power communications interface for communicating with the network 702. In this way, the tape nodes 718 and 716 create a hierarchical wireless network of nodes for transmitting, forwarding, bridging, relaying, or otherwise communicating wireless messages to, between, or on behalf of the peripheral tape node 718 and the network service 708 in a power-efficient and cost-effective way.

In some examples, the mobile gateway 710 is a mobile phone that is operated by a human operator and executes a client application 722 that is configured by the network service 708 to communicate with a designated set of tape nodes, including a master tape node 724 that is adhered to a parcel 726 (e.g., a box), and is further configured to communicate with the network service 708 over the network 702. In the illustrated example, the parcel 726 contains a first parcel labeled or sealed by a tape node 728 and containing a first asset 730, and a second parcel labeled or sealed by a tape node 732 and containing a second asset 734. As explained in detail below, the master tape node 724 communicates with each of the peripheral tape nodes 728, 732 and communicates with the mobile gateway 708 in accordance with a hierarchical wireless network of tape nodes. In some examples, each of the peripheral tape nodes 728, 732 includes a lower power wireless communications interface, and the master tape node includes a lower power communications interface for communicating with the peripheral tape nodes 728, 732 contained within the parcel 726, and a higher power communications interface for communicating with the mobile gateway 710. The higher power communications interface (e.g., a LoRa communications interface or a cellular communications interface) may have a longer wireless communication range than the lower power communications interface (e.g., a Bluetooth communication interface). The master tape node 724 is operable to relay wireless communications between the tape nodes 728, 732 contained within the parcel 726 and the mobile gateway 710, and the mobile gateway 710 is operable to relay wireless communications between the master tape node 724 and the network service 708 over the wireless network 702. In this way, the master tape node 724 and the peripheral tape nodes 728 and 732 create a hierarchical wireless network of nodes for transmitting, forwarding, relaying, or otherwise communicating wireless messages to, between, or on behalf of the peripheral tape nodes 728, 732 and the network service 708 in a power-efficient and cost-effective way.

In some examples, the stationary gateway 714 is implemented by a server executing a server application that is configured by the network service 708 to communicate with a designated set 740 of tape nodes 742, 744, 746, 748 that are adhered to respective parcels containing respective assets 750, 752, 754, 756 on a pallet 758. In other examples, the stationary gateway 714 is implemented by a tape node that is adhered to, for example, a wall, column or other infrastructure component of the environment 700, and includes a lower power communications interface for communicating with tape nodes within range of the stationary gateway 714 and a higher power communications interface for communicating with the network 702. In one embodiment, each of the tape nodes 742-748 is a peripheral tape node and is configured by the network service 708 to communicate individually with the stationary gateway 714, which relays communications from the tape nodes 742-748 to the network service 708 through the stationary gateway 714 and over the communications network 702. In another embodiment, one of the tape nodes 742-748 at a time is configured as a master tape node that transmits, forwards, relays, or otherwise communicate wireless messages to, between, or on behalf of the other tape nodes on the pallet 758. In this embodiment, the master tape node may be determined by the tape nodes 742-748 or designated by the network service 708. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 759 is adhered to the pallet 758 and is configured to perform the role of a master node for the tape nodes 742-748. In these ways, the tape nodes 742-748, 758 are configurable to create different hierarchical wireless networks of nodes for transmitting, forwarding, relaying, bridging, or otherwise communicating wireless messages with the network service 708 through the stationary gateway 714 and over the network 702 in a power-efficient and cost-effective way.

In the illustrated example, the stationary gateway 714 also is configured by the network service 708 to communicate with a designated set of tape nodes, including a master tape node 760 that is adhered to the inside of a door 762 of a shipping container 764, and is further configured to communicate with the network service 708 over the network 702. In the illustrated example, the shipping container 764 contains a number of parcels labeled or sealed by respective peripheral tape nodes 766 and containing respective assets. The master tape node 716 communicates with each of the peripheral tape nodes 766 and communicates with the stationary gateway 715 in accordance with a hierarchical wireless network of tape nodes. In some examples, each of the peripheral tape nodes 766 includes a lower power wireless communications interface of the type used in, e.g., tape node 602 (shown in FIG. 6), and the master tape node 760 is implemented by a tape node that includes a lower power communications interface for communicating with the peripheral tape nodes 766 contained within the shipping container 764, and a higher power communications interface for communicating with the stationary gateway 714.

In some examples, when the doors of the shipping container 764 are closed, the master tape node 760 is operable to communicate wirelessly with the peripheral tape nodes 766 contained within the shipping container 764. In an example, the master tape node 760 is configured to collect sensor data from the peripheral tape nodes and, in some embodiments, process the collected data to generate, for example, one or more histograms from the collected data. When the doors of the shipping container 764 are open, the master tape node 760 is programmed to detect the door opening (e.g., with an accelerometer component of the master tape node 760) and, in addition to reporting the door opening event to the network service 708, the master tape node 760 is further programmed to transmit the collected data and/or the processed data in one or more wireless messages to the stationary gateway 714. The stationary gateway 714, in turn, is operable to transmit the wireless messages received from the master tape node 760 to the network service 708 over the wireless network 702. Alternatively, in some examples, the stationary gateway 714 also is operable to perform operations on the data received from the master tape node 760 with the same type of data produced by the master node 759 based on sensor data collected from the tape nodes 742-748. In this way, the master tape node 760 and the peripheral tape nodes 766 create a hierarchical wireless network of nodes for transmitting, forwarding, relaying, or otherwise communicating wireless messages to, between, or on behalf of the peripheral tape nodes 766 and the network service 708 in a power-efficient and cost-effective way.

In an example of the embodiment shown in FIG. 7, there are three classes of tape nodes: a short range tape node, a medium range tape node, and a long range tape node. The short range tape nodes typically are adhered directly to parcels containing assets. In the illustrated example, the tape nodes 718, 728, 732, 742-748, 766 are short range tape nodes. The short range tape nodes typically communicate with a low power wireless communication protocol (e.g., Bluetooth LE, Zigbee, or Z-wave). The medium range tape nodes typically are adhered to objects (e.g., a box 726 and a shipping container 760) that are associated with multiple parcels or assets that are separated from the medium range tape nodes by a barrier or a large distance. In the illustrated example, the tape nodes 724 and 760 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 700. In the illustrated example, the mobile gateway tape node 712 and the stationary gateway tape node 714 are long range tape nodes. The long range tape nodes typically communicate with other nodes using a high power wireless communication protocol (e.g., a cellular data communication protocol). In some examples, the mobile gateway tape node 736 is adhered to a mobile vehicle (e.g., a truck). In these examples, the mobile gateway 712 may be moved to different locations in the environment 700 to assist in connecting other tape nodes to the server 704. In some examples, the stationary gateway tape node 714 may be attached to a stationary structure (e.g., a wall) in the environment 700 with a known geographic location. In these examples, other tape nodes in the environment can determine their geographic location by querying the gateway tape node 714.

Hierarchical Wireless Communications Network

Figure 8:
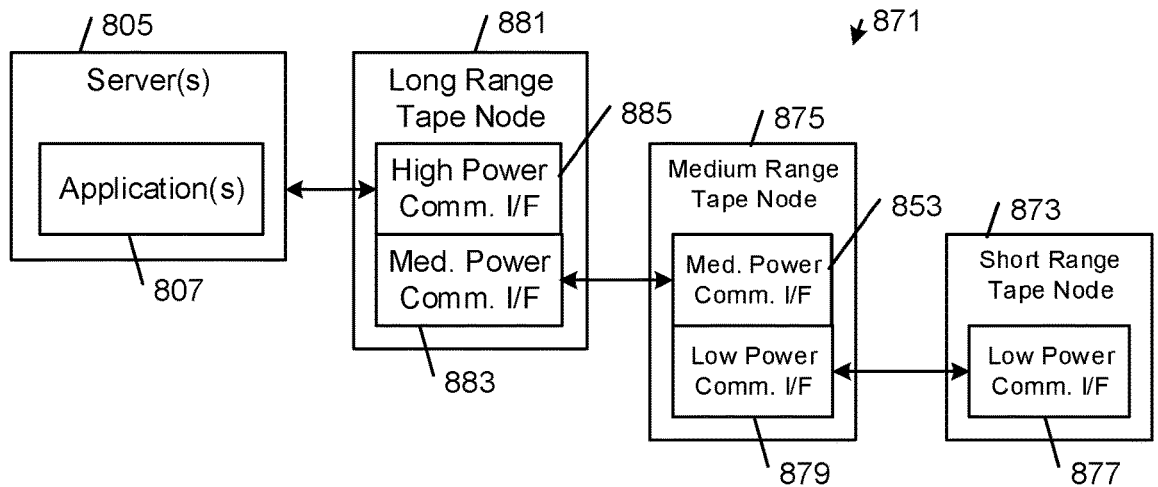
FIG. 8 is a diagrammatic view of a hierarchical communications network.

FIG. 8 shows an example hierarchical wireless communications network of tape nodes 871. In this example, the short range tape node 872 and the medium range tape node 874 communicate with one another over their respective low power wireless communication interfaces 876, 878. The medium range tape node 874 and the long range tape node 880 communicate with one another over their respective medium power wireless communication interfaces 878, 882. The long range tape node 880 and the network server 804 communicate with one another over the high power wireless communication interface 884. In some examples, the low power communication interfaces 876, 878 establish wireless communications with one another in accordance with the Bluetooth LE protocol, the medium power communication interfaces 852, 882 establish wireless communications with one another in accordance with the LoRa communications protocol, and the high power communication interface 884 establishes wireless communications with the server 704 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 704 of the network service 708 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 704 of the network service 708. The schedule usually dictates all aspects of the communication, including the times when particular tape nodes should communicate, the mode of communication, and the contents of the communication. In one example, the server 704 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 704, either directly or indirectly through a gateway tape node (e.g., the long range tape node 716 adhered to the mobile vehicle 712 or the long range tape node 714 adhered to an infrastructure component of the environment 700). In other examples, the master tape node processes the information contained in the received data packets and transmits the processed information to the server network node 704.

Figure 9:
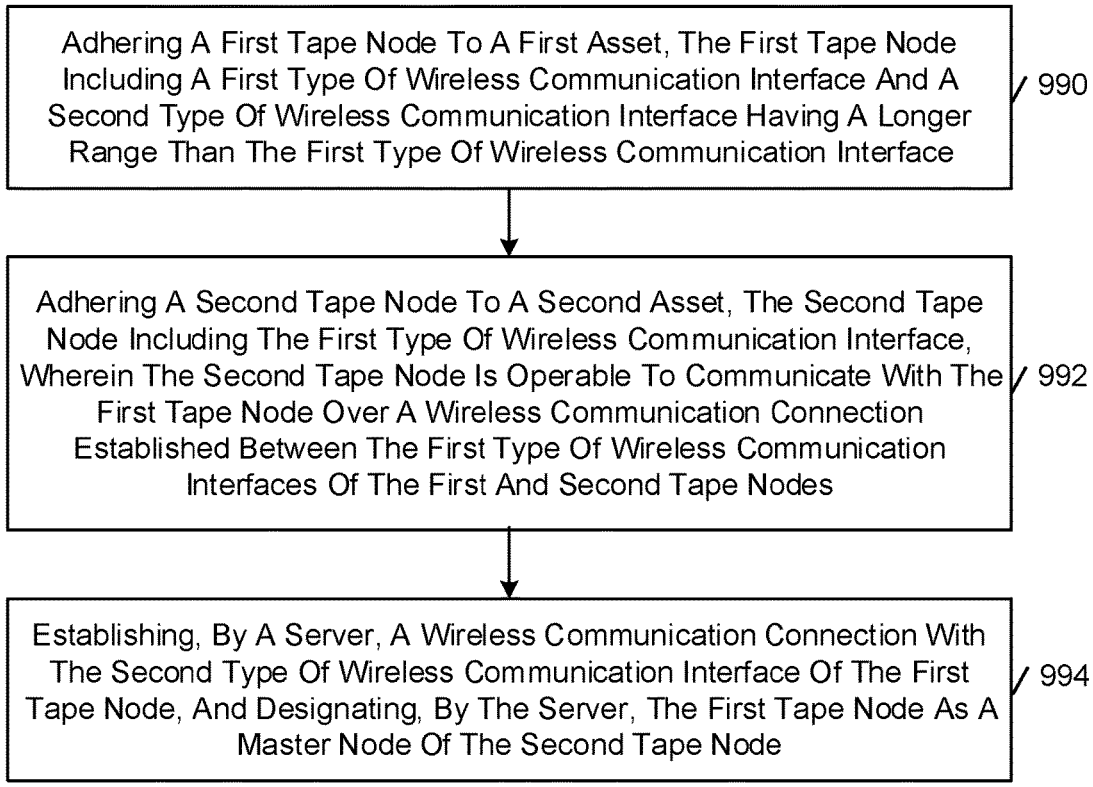
FIG. 9 is a flow diagram of a method of creating a hierarchical communications network.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 990). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., a server 704 of a network service 708) establishes a wireless communication connection with the second type of wireless communication interface of the first tape node, and the application transmits programmatic code executable by the first tape node to function as a master tape node with respect to the second tape node (FIG. 9, block 994).

In some embodiments, the second tape node is assigned the role of the master tape node with respect to the first tape node.

In some embodiments, a hierarchy is established with respect to the wireless tags described in FIGS. 1A-1C. For example, in environments comprising a plurality of wireless tags associated with assets, one or more of the wireless tags is a master tape node. The one or more master tape nodes may be assigned based on having a medium or high communications range as described above, or may be assigned based on other criteria, e.g., having a highest battery level at a time of deployment, having a relative location to one or more other wireless tags, or the like. The designated master tape nodes may receive information from a set of wireless tags describing, for example, a unique identifier of each wireless tag of the set of wireless tags, a respective battery level for the wireless tags, a set of sensor data describing an environment of the wireless tag and the like. The designated master node may communicate the received information to a server or cloud of the wireless tracking system 700 for processing, or may perform one or more processes and/or communicate subsets of the received information to the server or cloud of the wireless tracking system 700 (e.g., identifying and transmitting information describing wireless tags having low battery levels only).

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
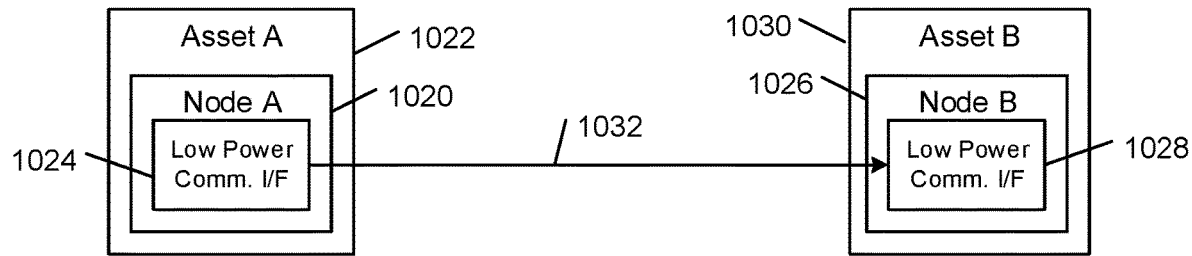
FIGS. 10A-10E are diagrammatic views of exemplary use cases for a distributed agent operating system.

Referring to FIG. 10A, a node 1020 (Node A) is associated with an asset 1022 (Asset A). In some embodiments, the node 1020 may be implemented as a tape node that is used to seal the asset 1022 or it may be implemented as a label node that is used to label the asset 1022; alternatively, the node 1020 may be implemented as a non-tape node that is inserted within the asset 1022 or embedded in or otherwise attached to the interior or exterior of the asset 1022. In the illustrated embodiment, the node 1020 includes a low power communications interface 1024 (e.g., a Bluetooth Low Energy communications interface). Another node 1026 (Node B), which is associated with another asset 1030 (Asset B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
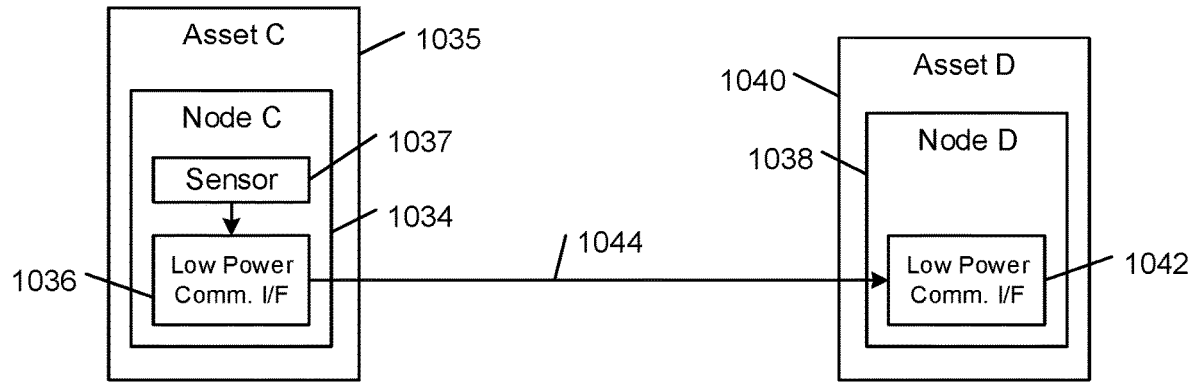

Referring to FIG. 10B, a node 1034 (Node C) is associated with an asset 1035 (Asset C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another asset 1040 (Asset D), is similarly equipped with a compatible low power communications interface 1042 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
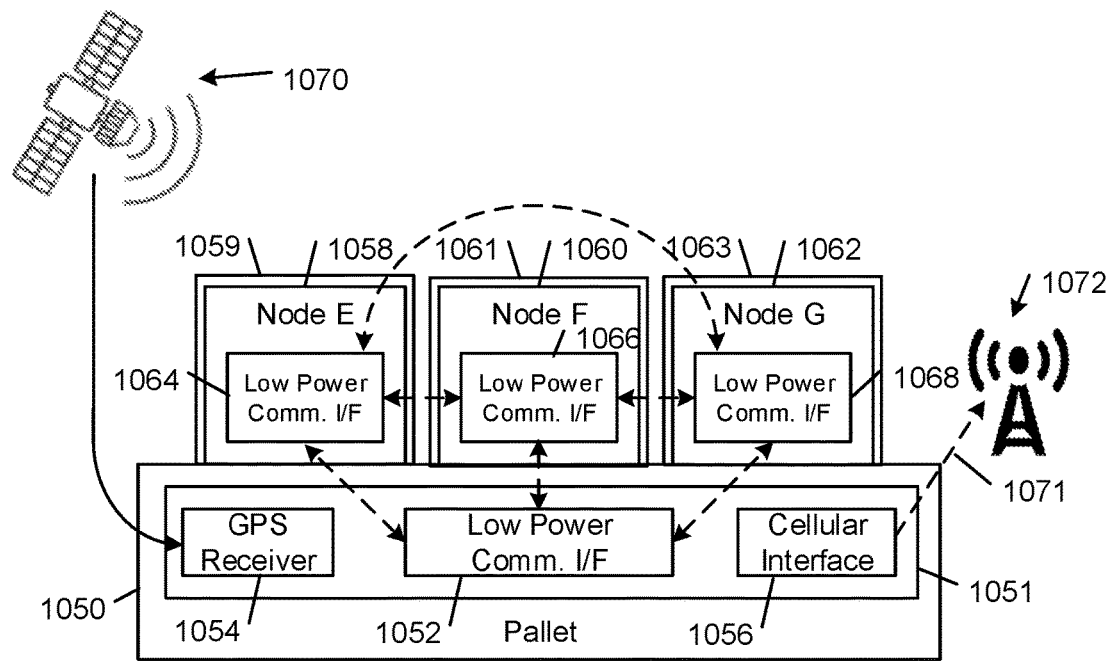

Referring to FIG. 10C, a pallet 1050 is associated with a master node 1051 that includes a low power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G and the master node 1051 are connected to each of the other nodes over a respective low power communications path (shown by dashed lines).

In some embodiments, the assets 1059, 1061, 1063 are grouped together because they are related. For example, the assets 1059, 1061, 1063 may share the same shipping itinerary or a portion thereof. In an example scenario, the master pallet node 1050 scans for advertising packets that are broadcasted from the peripheral nodes 1058, 1060, 1062. In some examples, the peripheral nodes broadcast advertising packets during respective scheduled broadcast intervals. The master node 1051 can determine the presence of the assets 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding assets 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-package group, the master node 1051 may identify another asset arrives in the vicinity of the multi-package group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 1058, 1060, 1062 include environmental sensors for obtaining information regarding environmental conditions in the vicinity of the associated assets 1059, 1061, 1063. Examples of such environmental sensors include temperature sensors, humidity sensors, acceleration sensors, vibration sensors, shock sensors, pressure sensors, altitude sensors, light sensors, and orientation sensors. In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the assets 1059, 1061, 1063 from the master node 1051 can be estimated based on the average signal strength of the advertising packets that the master node 1051 receives from the respective peripheral node. The master node 1051 can then transmit its own location and the locations of the asset nodes E, F, and G to a server over a cellular interface connection with a cell tower 1072. Other methods of determining the distance of each of the assets 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some embodiments, the peripheral nodes 1058, 1060, 1062 are configured to transmit, responsive to a request by the master node 1051 or during a scheduled broadcast interval, information describing a current performance level of one or more electronic components of peripheral nodes 1058, 1060, 1062 in conjunction with a unique identifier of the respective peripheral node. The master node 1051 may collect and optionally perform one or more processing operations on the data to identify one or more peripheral nodes 1058, 1060, 1062 having a current performance level less than a threshold level. The master node 1051 can then transmit its own performance level and identifier and the respective performance levels and identifiers of the peripheral nodes 1058, 1060, 1062 to a server over a cellular interface connection or other communications interface. As such, nodes are able to autonomously detect when one or more electronic components of peripheral nodes 1058, 1060, 1062 or master nodes 1051 are below a threshold performance level and should be renovated or recycled. For example, the peripheral nodes 1058, 1060, 1062 are configured to transmit information describing a current energy level of an energy source (e.g., rechargeable battery) of the peripheral nodes, and the master node 1051 is configured to process the received information to determine when a peripheral node is below a threshold energy level.

In some examples, nodes are able to autonomously detect logistics execution errors if assets that are supposed to travel together no longer travel together, and raise an alert. For example, a node (e.g., the master node 1051 or one of the peripheral nodes 1058, 1060, 1062) alerts the server when the node determines that a particular asset 1059 is being or has already been improperly separated from the group of assets. The node may determine that there has been an improper separation of the particular asset 1059 in a variety of ways. For example, the associated node 1058 that is bound to the particular asset 1059 may include an accelerometer that generates a signal in response to movement of the asset from the pallet. In accordance with its intelligent agent program code, the associated node 1058 determines that the master node 1051 has not disassociated the particular asset 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 10D:
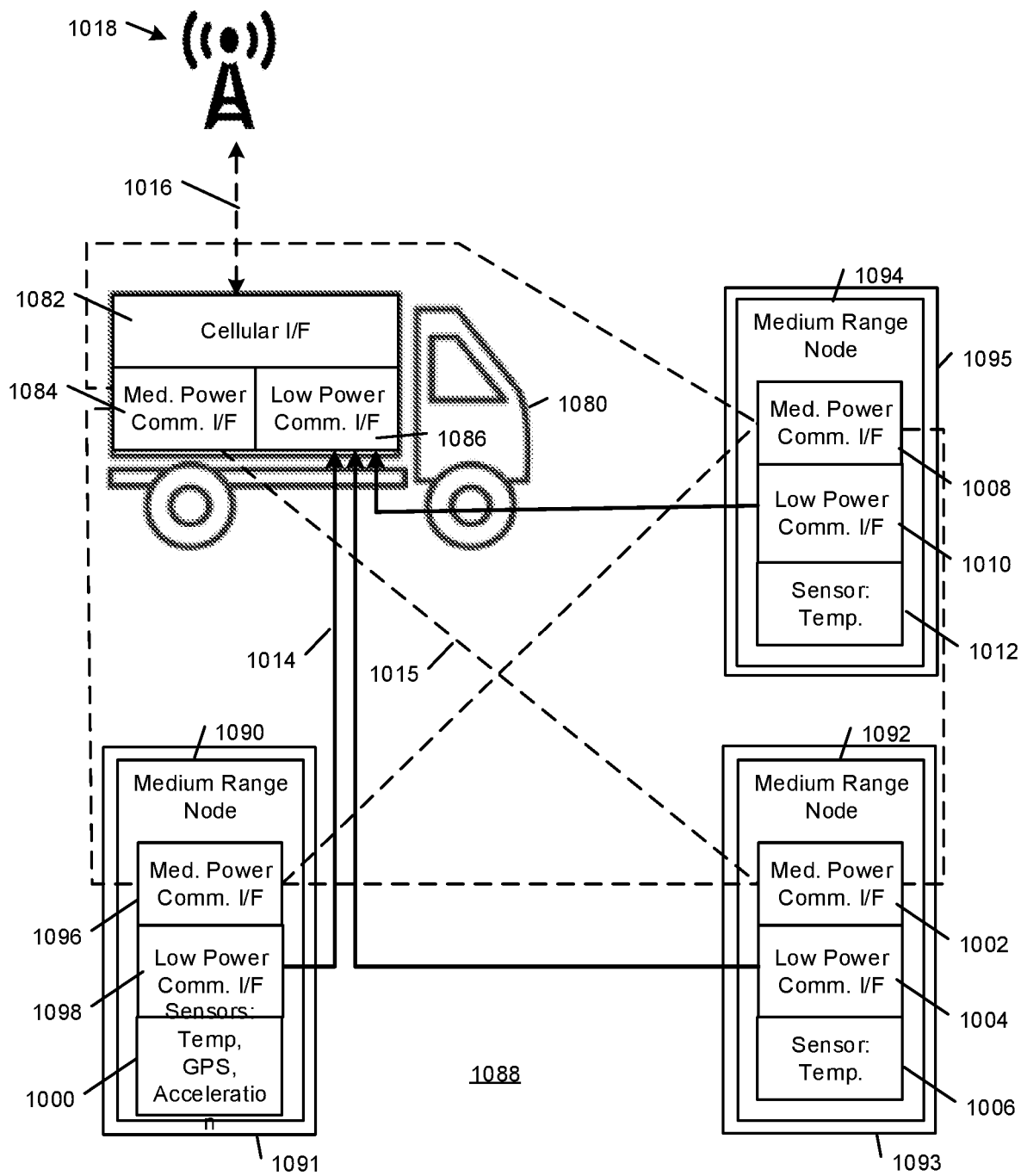

Referring to FIG. 10D, a truck 1080 is configured as a mobile node or mobile hub that includes a cellular communications interface 1082, a medium power communications interface 1084, and a low power communications interface 1086. The communications interfaces 1080-586 may be implemented on one or more tape and non-tape nodes. In an illustrative scenario, the truck 1080 visits a storage facility, such as a warehouse 1088, to wirelessly obtain temperature data generated by temperature sensors in the medium range nodes 1090, 1092, 1094. The warehouse 1088 contains nodes 1090, 1092, and 1094 that are associated with respective packages 1091, 1093, 1095. In the illustrated embodiment, each node 1090-594 is a medium range node that includes a respective medium power communications interface 1096, 1002, 1008, a respective low power communications interface 1098, 1004, 1010 and one or more respective sensors 1000, 1006, 1012. In the illustrated embodiment, each of the package nodes 1090, 1092, 1094 and the truck 1080 is connected to each of the other ones of the package nodes through a respective medium power communications path (shown by dashed lines). In some embodiments, the medium power communications paths are LoRa formatted communication paths.

In some embodiments, the communications interfaces 1084 and 1086 (e.g., a LoRa communications interface and a Bluetooth Low Energy communications interface) on the node on the truck 1080 is programmed to broadcast advertisement packets to establish connections with other network nodes within range of the truck node. A warehouse 1088 includes medium range nodes 1090, 1092, 1094 that are associated with respective containers 1091, 1093, 1095 (e.g., packages, boxes, pallets, and the like). When the truck node's low power interface 1086 is within range of any of the medium range nodes 1090, 1092, 1094 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1090, 1092, 1094, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1014 or a LoRa formatted communication path 1015), the truck node determines the identity information for the medium range node 1090 (e.g., a peripheral node), the medium range node's capabilities include retrieving temperature data, and the medium range node's services include transmitting temperature data to other nodes. Depending of the size of the warehouse 1088, the truck 1080 initially may communicate with the nodes 1090, 1092, 1094 using a low power communications interface (e.g., Bluetooth Low Energy interface). If any of the anticipated nodes fails to respond to repeated broadcasts of advertising packets by the truck 1080, the truck 1080 will try to communicate with the non-responsive nodes using a medium power communications interface (e.g., LoRa interface). In response to a request from the truck node 1084, the medium range node 1090 transmits an indication of its measured temperature data to the truck node. The truck node repeats the process for each of the other medium range nodes 1092, 1094 that generate temperature measurement data in the warehouse 1088. The truck node reports the collected (and optionally processed, either by the medium range nodes 1090, 1092, 1094 or the truck node) temperature data to a server over a cellular communication path 1016 with a cellular network 1018.

Figure 10E:
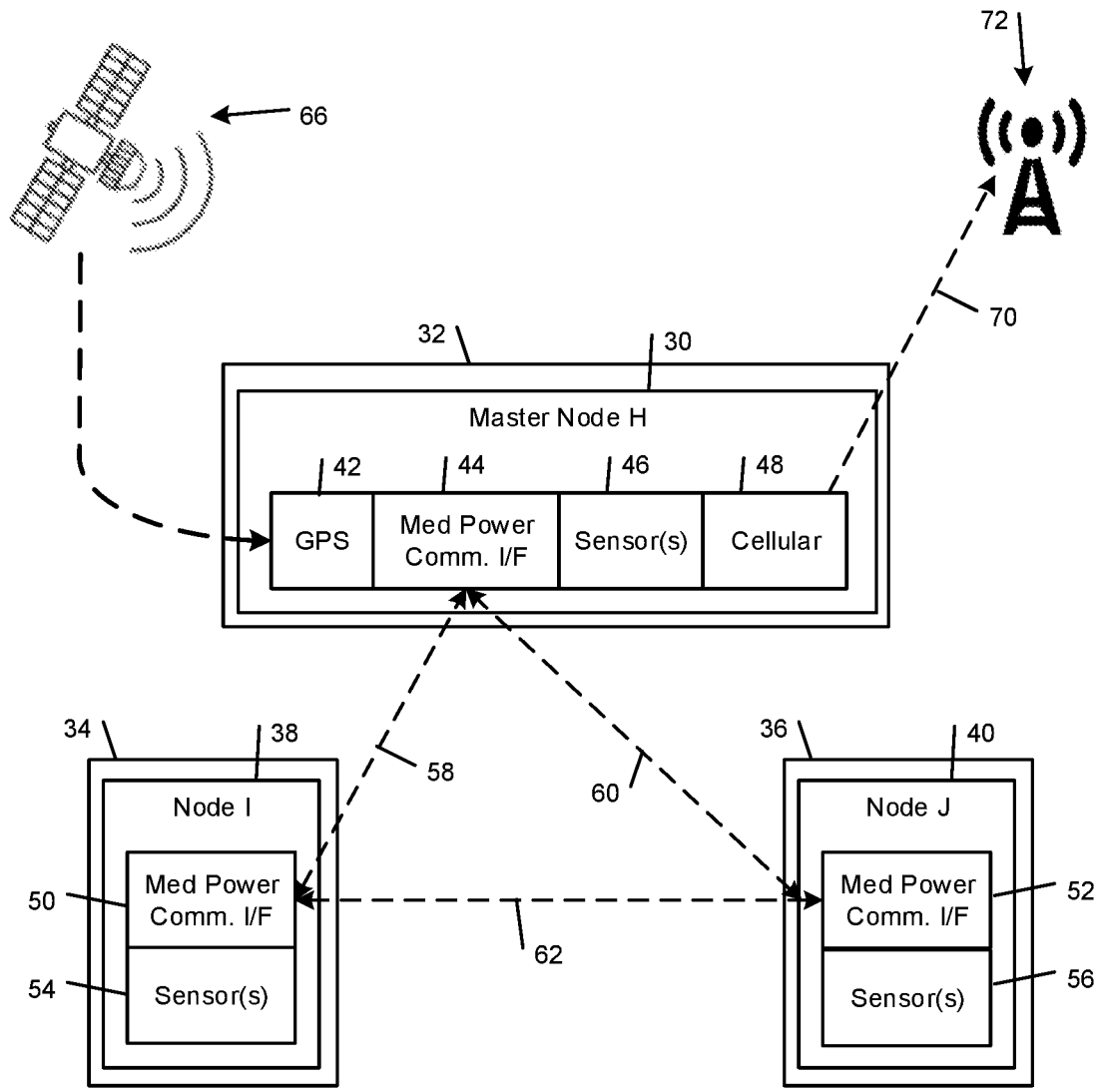

Referring to FIG. 10E, a master node 30 is associated with an item 32 (e.g., a package) and grouped together with other items 34, 36 (e.g., packages) that are associated with respective peripheral nodes 38, 40. The master node 30 includes a GPS receiver 42, a medium power communications interface 44, one or more sensors 46, and a cellular communications interface 48. Each of the peripheral nodes 38, 40 includes a respective medium power communications interface 50, 52 and one or more respective sensors 54, 56. In the illustrated embodiment, the peripheral and master nodes are connected to one another other over respective pairwise communications paths (shown by dashed lines). In some embodiments, the nodes 30 38, 40 communicate through respective LoRa communications interfaces over LoRa formatted communications paths 58, 60, 62.

In the illustrated embodiment, the master and peripheral nodes 38, 38, 40 include environmental sensors for obtaining information regarding environmental conditions in the vicinity of the associated packages 32, 34, 36. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 30 periodically broadcasts advertising packets in the surrounding area. When the peripheral nodes 38, 40 are within range of master node 30, and are operating in a listening mode, the peripheral nodes 38, 40 will extract the address of master node 30 and potentially other information (e.g., security information) from the advertising packets. If, according to their respective programmatic code, the peripheral nodes 38, 40 determine that they are authorized to connect to the master node 30, the peripheral nodes 38, 40 will attempt to pair with the master node 30. In this process, the peripheral nodes 38, 40 and the master node and the peripheral nodes determine each other's identities, capabilities, and services. For example, after successfully establishing a respective communication path 58, 60 with each of the peripheral nodes 38, 40 (e.g., a LoRa formatted communication path), the master node 30 determines certain information about the peripheral nodes 38, 40, such as their identity information (e.g., peripheral nodes), their capabilities (e.g., measuring temperature data), and their services include transmitting temperature data to other nodes.

After establishing LoRa formatted communications paths 58, 60 with the peripheral nodes 38, 40, the master node 30 transmits requests for the peripheral nodes 38, 40 to transmit their measured and/or locally processed temperature data to the master node 30.

In the illustrated embodiment, the master node 30 can determine its own location based on geolocation data transmitted by a satellite-based radio navigation system 66 (e.g., GPS, GLONASS, and NAVSTAR) and received by the GPS receiver 42 component of the master node 30. In an alternative embodiment, the location of the master node 30 can be determined using cellular based navigation techniques that use mobile communication technologies (e.g., GSM, GPRS, CDMA, etc.) to implement one or more cell-based localization techniques. After the master node 30 has ascertained its location, the distance of each of the packages 34, 36 from the master node 30 can be estimated based on the average signal strength of the advertising packets that the master node 30 receives from the respective peripheral node. The master node 30 can then transmit its own location and the locations of the package nodes E, F, and G to a server over a cellular interface connection with a cell tower 72. Other methods of determining the distance of each of the packages 34, 36 from the master node 30, such as Received Signal-Strength Index (RSSI) based indoor localization techniques, also may be used.

In some embodiments, after determining its own location and the locations of the peripheral nodes, the master node 30 reports the location data the collected and optionally processed (e.g., either by the peripheral nodes peripheral nodes 34, 36 or the master node 30) sensor data to a server over a cellular communication path 70 on a cellular network 72.

Figure 11A:
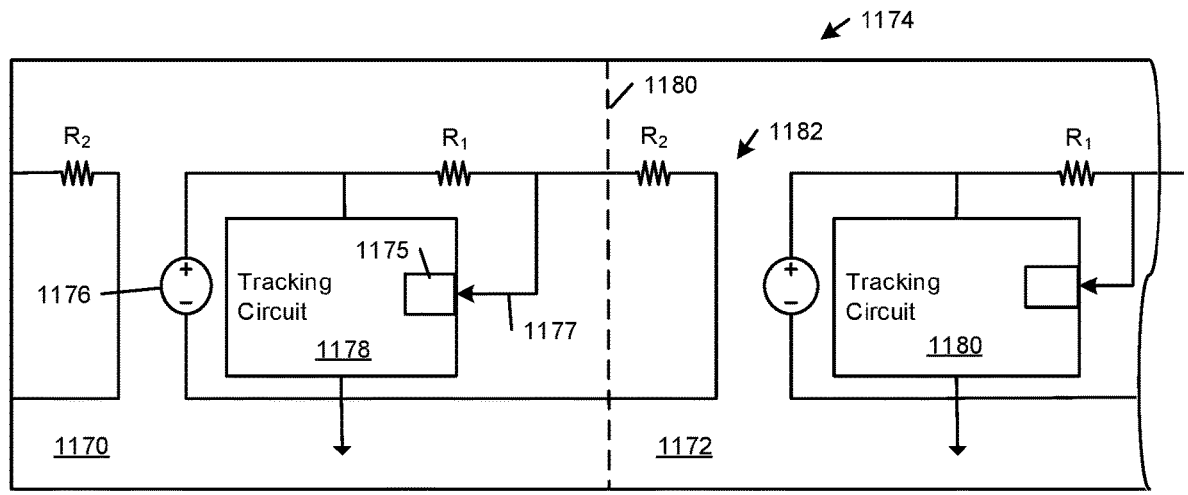
FIG. 11A-11B are diagrammatic top views of a length of an example tracking adhesive product.

Referring to FIG. 11A, in some examples, each of one or more of the segments 1170, 1172 of a continuous strip of wireless tags 1174 includes a respective circuit 1175 that delivers power from the respective energy source 1176 to the respective tracking circuit 1178 (e.g., a processor and one or more wireless communications circuits) in response to an event. In some of these examples, the wake circuit 1175 is configured to transition from an off state to an on state when the voltage on the wake node 1177 exceeds a threshold level, at which point the wake circuit transitions to an on state to power-on the segment 1170. In the illustrated example, this occurs when the user separates the segment from the tracking adhesive product 1174, for example, by cutting across the continuous strip of wireless tags 1174 at a designated location (e.g., along a designated cut-line 1180). In particular, in its initial, un-cut state, a minimal amount of current flows through the resistors $R_1$ and $R_2$. As a result, the voltage on the wake node 1170 remains below the threshold turn-on level. After the user cuts across the continuous strip of wireless tags 1174 along the designated cut-line 1180, the user creates an open circuit in the loop 1182, which pulls the voltage of the wake node above the threshold level and turns on the wake circuit 1175. As a result, the voltage across the energy source 1176 will appear across the tracking circuit 1178 and, thereby, turn on the segment 1170. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a wireless tag includes a respective sensor and a respective wake circuit that delivers power from the respective energy source to the respective one or more of the respective tracking components 1178 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 11B:
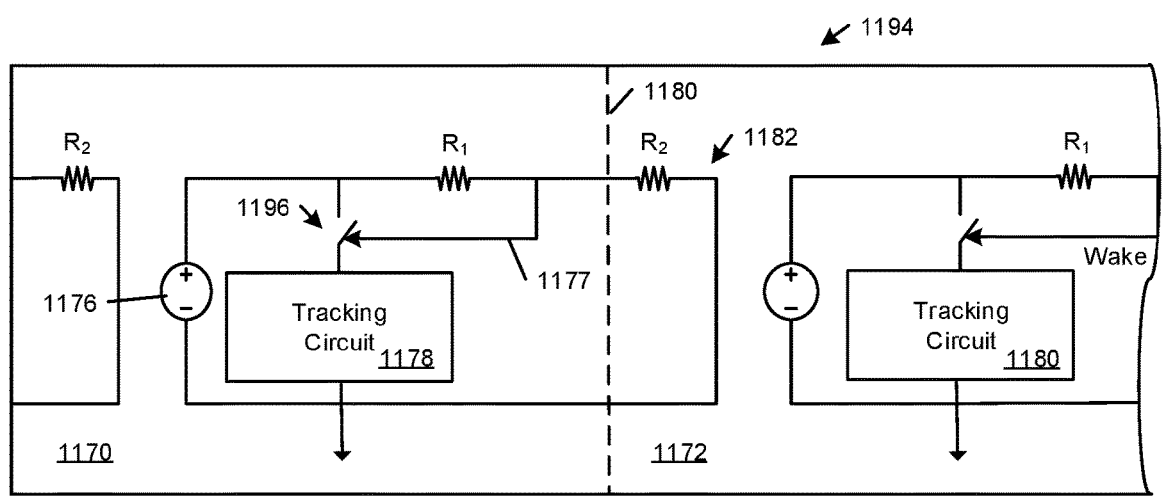

FIG. 11B shows another example of a continuous strip of wireless tags 1194 that delivers power from the respective energy source 1176 to the respective tracking circuit 1178 (e.g., a processor and one or more wireless communications circuits) in response to an event. This example is similar in structure and operation as the continuous strip of wireless tags 1194 shown in FIG. 11A, except that the wake circuit 1175 is replaced by a switch 1196 that is configured to transition from an open state to a closed state when the voltage on the switch node 1177 exceeds a threshold level. In the initial state of the tracking adhesive product 1194, the voltage on the switch node is below the threshold level as a result of the low current level flowing through the resistors $R_1$ and $R_2$. After the user cuts across the continuous strip of wireless tags 1194 along the designated cut-line 1180, the user creates an open circuit in the loop 1182, which pulls up the voltage on the switch node above the threshold level to close the switch 1196 and turn on the tracking circuit 1178.

Renovating Components of Wireless Tags

The following description describes different embodiments for renovating, refurbishing, or recycling components of the wireless tags. In some examples, a battery or batteries of a wireless tag is recharged or replaced. In other examples, other components of the wireless tag, such as electronic sensors, wireless communications systems, processors, and the like, are renovated, refurbished, recycled, or replaced instead of or in addition to a battery or batteries of the wireless tag.

Figure 12A:
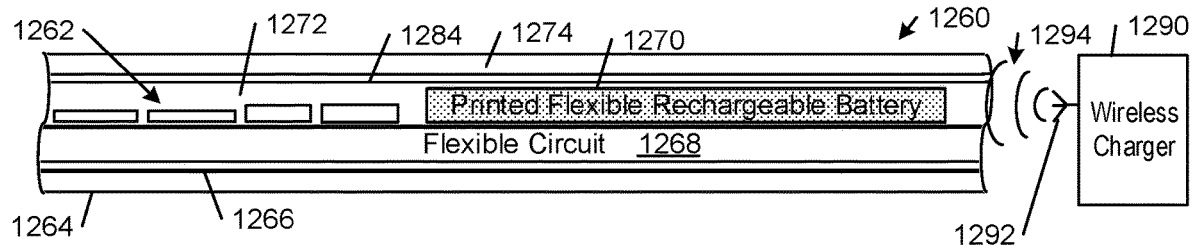
FIG. 12A is a diagrammatic cross-sectional side view of a wireless tag that includes a printed flexible rechargeable battery being charged by wireless charger.

FIG. 12A shows a cross-sectional side view of a portion of a segment of a wireless tag 1260 that includes tracking components 1262. The tracking components 1262 may include embodiments of the components of the wireless tag circuit 532 shown in FIG. 5. The wireless tag 1260 is an embodiment of the wireless tag 112. The wireless tag segment 1260 includes a flexible substrate 1264 with an adhesive layer on its top surface and an optional adhesive layer on its bottom surface. If the bottom adhesive layer is present, a release liner (not shown) may be (weakly) adhered to the bottom surface of the adhesive layer. The adhesive layer 1266 bonds the flexible substrate 1264 to a bottom surface of a flexible circuit 1268 that includes one or more wiring layers (not shown) that connect a processor, a circuit (e.g., a wireless receiver circuit, wireless transmitter circuit, or wireless transceiver circuit), an antenna, and other components (e.g., one or more sensors) in the device layer to each other and to a flexible battery 1270 and, thereby, enable the tracking and other functionalities of the wireless tag 1260. A flexible polymer layer 1272 encapsulates the device layer and thereby reduces the risk of damage that may result from the intrusion of contaminants and/or liquids (e.g., water). The flexible polymer layer 1272 also planarizes the device, which distributes forces generated in, on or across the tracking adhesive product segment 1260 so as to reduce potentially damaging asymmetric stresses that might be caused by the application of bending, torqueing, pressing, or other forces on the tracking adhesive product segment 1260. A flexible cover 1274 is bonded to the planarizing polymer 1284 by an adhesive layer 1282.

The flexible battery 1270 is a rechargeable battery. In some embodiments, the flexible battery 1270 is a printed flexible battery. In the illustrated embodiment, the wireless tag 1260 is configured to be recharged by a wireless charger 1290 that includes an antenna 1292 that generates radio frequency waves 1294 that are captured by a conventional RF receiver circuit configured to generate electrical power to charge the flexible rechargeable battery 1270. Thus, by using the wireless charger 1290 the wireless tag 1260 may be recharged when its flexible battery 1270 is low. In other embodiments, the wireless charger 1290 is an inductive charger, and the wireless tag includes an inductive charging circuit. In this case, the flexible battery 1270 is recharged by inductive charging (e.g., using the Qi standard). In other embodiments, the wireless tag includes a conventional single or multiple cell rechargeable battery, instead of the flexible battery 1270.

Figure 12B:
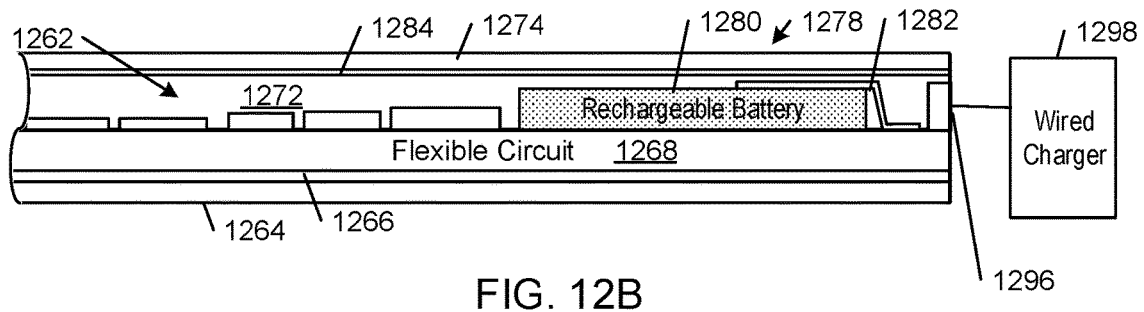
FIG. 12B is diagrammatic cross-sectional side view of a wireless tag that includes a rechargeable battery being charged by wired charger.

FIG. 12B shows a cross-sectional side view of an alternative example 1278 of the segment of the wireless tag 1260 shown in FIG. 12A. The only difference between this alternative example 1278 and the example 1260 shown in FIG. 12A is that the wireless tag 1278 includes a conventional single or multiple cell rechargeable battery 1280 (e.g., a watch style disk or button cell battery) and associated electrical connection apparatus 1282 (e.g., a metal clip) that electrically connects the electrodes of the battery 1280 to contact pads on the flexible circuit 1268, instead of the printed flexible rechargeable battery 1270 and the RF receiver circuit.

In the illustrated embodiment, the wireless tag 1278 includes an electrical adapter 1296 that is configured to receive an electrical connection with a wired charger 1298. The wired charger can be removable connected to the electrical adapter 1296 to provide electrical power to the rechargeable battery 1280. The wired charger 1298 may be connected to a power source (e.g., an electrical line) or include a power source 1298 integrated with the wired charger 1298. The wired charger may be, for example, a USB charger or some other type of wired charger, according to some embodiments.

Figure 13A:
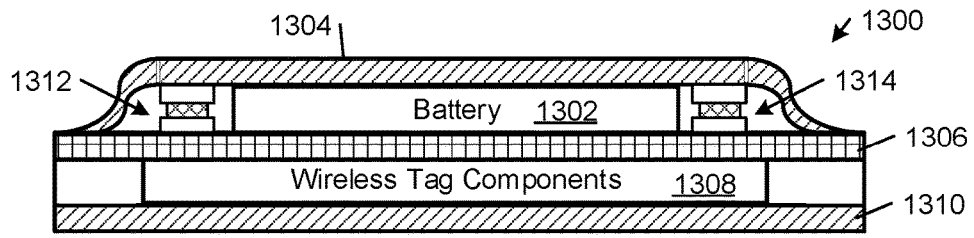
FIG. 13A is a diagrammatic cross-sectional side view of a wireless tag that includes wireless tag components and an embedded battery.
Figure 13B:
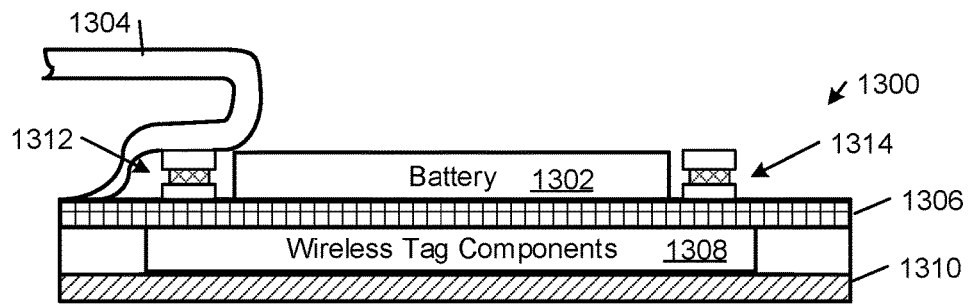
FIG. 13B is a diagrammatic cross-sectional side view of the wireless tag shown in FIG. 13A with a flexible cover peeled back to allow the embedded battery to be replaced.

FIGS. 13A and 13B show an embodiment of a wireless tag 1300 that includes an embedded battery 1302. The wireless tag 1300 may be an embodiment of the wireless tag 112. FIG. 13A shows the wireless tag 1300 with a flexible cover layer 1304 covering a battery 1302. The battery 1302 may be any type of battery, including but not limited to a rechargeable battery, a thin film printed battery, a conventional coin cell battery, an alkaline battery, or the like. The wireless tag 1300 includes the removable cover 1304, a circuit layer 1306, a component layer 1308, and a substrate layer 1310. In some examples, the removable cover 1304 includes a flexible material (e.g., plastic) that is attached to the top surface of the battery 1302 with an adhesive layer. In some embodiments, the adhesive layer is a pressure sensitive adhesive that holds the flexible cover layer 1304 to the battery 1302 and other underlying structures. The circuit layer 1306 includes circuits for interconnecting and delivering power from the battery 1302 through the terminals 1312, 1314 to the wireless tag components 1308.

Referring to FIG. 13B, the flexible cover layer 1304 can be selectively removed to expose the underlying battery 1302 and terminals 1312, 1314. This allows access to the battery for replacement, wired charging, or wireless charging. For example, if the wireless tag 1300 is capable of wireless charging, removing the flexible cover layer 1304 may expose a wireless charging circuit (e.g., a RF receiver or an inductive charging circuit/loop) and allow for a user to align the wireless charging circuit with a wireless charger (e.g., wireless charger 1290). In the example of wired charging, removing the flexible cover layer 1304 may expose an electrical adapter (e.g., electrical adapter 1296) allowing for a user to connect a wired charger (e.g., wired charger 1278) to the electrical adapter for recharging the wireless tag 1300. Partially or completely removing the flexible cover 1304 also enables the terminals and other components of the wireless tag to be cleaned or replaced, according to some embodiments. After one or more of the wireless tag components have been inspected, renovated, replaced, recycled, had some other modification of the components, or some combination thereof, the same flexible cover layer 1304 may be reattached over the battery 1302, the terminals 1312, 1314, and the circuit layer 1306. Alternatively, a new flexible cover layer may be used to seal the cover layer 1304 over the battery 1302, the terminals 1312, 1314, and the circuit layer 1306, in some embodiments.

The removable flexible cover layer 1304 protects the components of the wireless tag 1300 while it is used to track an asset, wirelessly communicate with nodes of the tracking system 700, or perform other functions, but allows for the battery 1302 and other components to be renovated, replaced, recharged, inspected, and/or modified by a user.

Figure 14A:
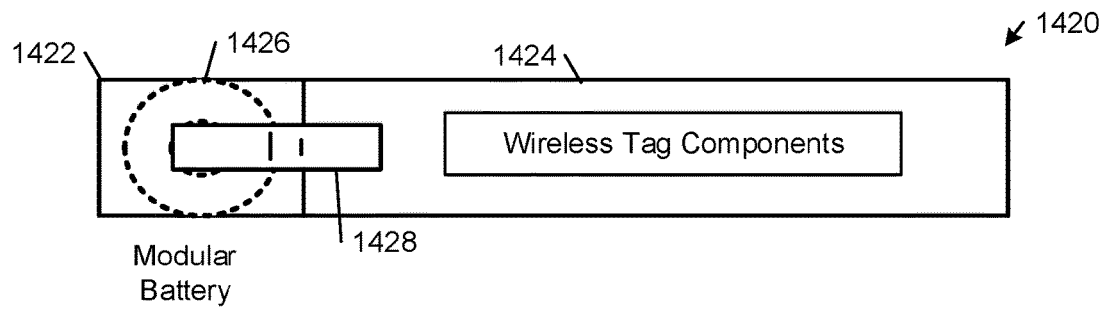
FIG. 14A is a diagrammatic side view of a modular wireless tag that includes a battery compartment that is electrically connected to the wireless tag components module.

FIG. 14A is a diagrammatic side view of a modular wireless tag 1420 that includes a battery module 1422 that is electrically connected to the wireless tag components module 1424. The modular wireless tag 1420 may be an embodiment of the wireless tag 12. The battery module 1422 includes a compartment for a battery 1426. In the illustrated embodiment, the battery module 1422 includes a pair of resilient latch mechanisms 1428 on opposite exterior sides of the modular battery compartment 1426 that each snap over a respective ridge member 1430 of a pair of ridge members on opposite sides of the wireless tag components module 1424. In other embodiments, the battery module 1422 includes more than two resilient latch mechanisms 1428 and corresponding ridge members 1430 of the wireless tag components module 1424. For example, the battery module 1422 and the wireless tag components module 1424 may include four resilient latch mechanisms 1428 and four corresponding ridge members, one on each of a lateral side (e.g., the side shown in FIGS. 14A and 14B), an opposite lateral side, a top side, and a bottom side of the battery module 1422 and the wireless tag components module 1424. The modular battery compartment 1426 includes an electrical interface that matches a corresponding electrical interface in the wireless tag components module 1424 so that electrical power is delivered to the wireless tag components when the modular battery compartment 1426 is snapped onto the wireless tag components module 1424.

Figure 14B:
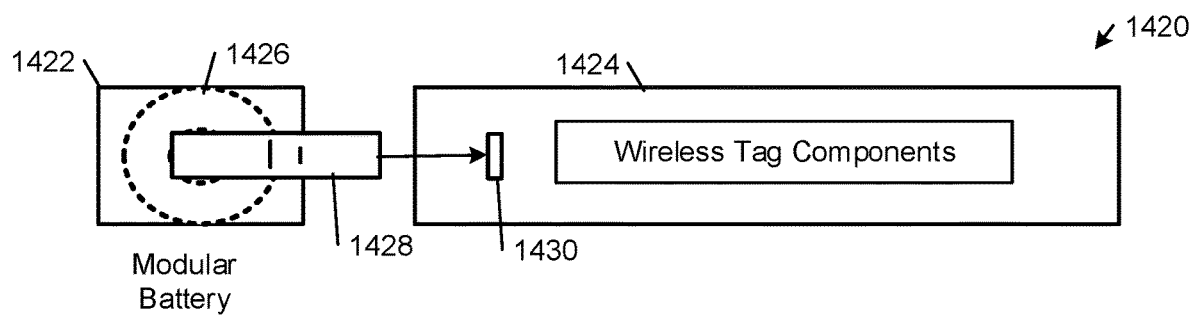
FIG. 14B shows a diagrammatic side view of the modular wireless tag depicted in FIG. 14A with the battery compartment detached from the wireless tag components module.

FIG. 14B shows a diagrammatic side view of the modular wireless tag 1420 depicted in FIG. 14A with the modular battery compartment 1426 detached from the wireless tag components module 1424. In the illustrated embodiment, the user may detach the modular battery compartment 1426 from the wireless tag components module 1424 by pulling outwardly on one or both distal ends of the resilient latch mechanisms 1428 on opposite exterior sides of the modular battery compartment.

Figure 14C:
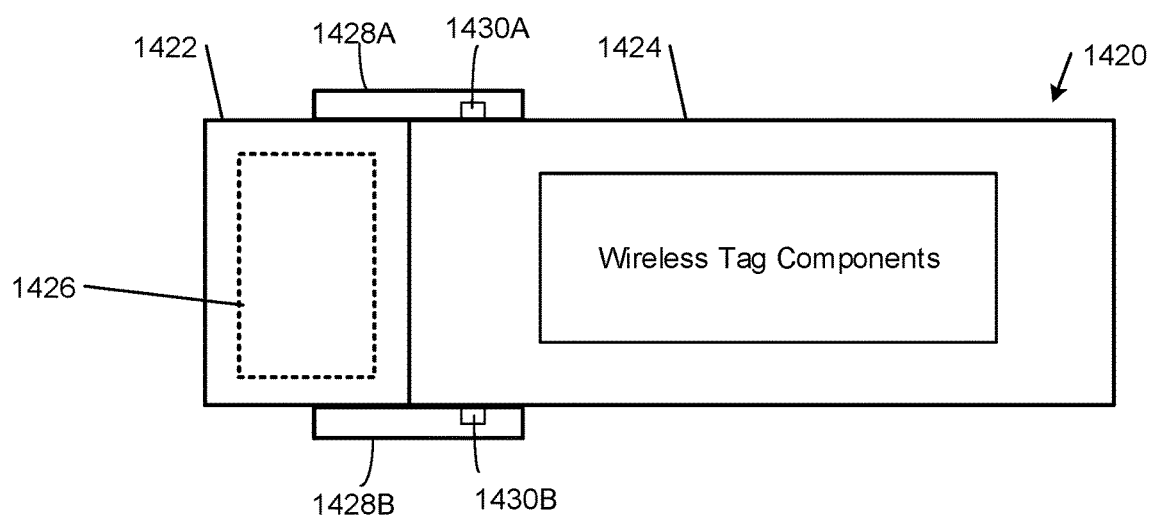
FIG. 14C shows a diagrammatic top view of the modular wireless tag depicted in FIG. 14A.

FIG. 14C shows a diagrammatic top view of the modular wireless tag 1420 depicted in FIGS. 14A-14B with the battery module 1422 attached to the wireless tag components module 1424 via two resilient latch mechanisms 1428A, 1428B. As discussed above, the resilient latch mechanisms 1428A, 1428B are attached or affixed to the battery module 1422 and are configured to snap over a respective ridge member 1430A, 1430B shown in FIG. 14B. When the resilient latch mechanisms 1428A, 1428B are snapped over the respective ridge members 1430A, 1430B, electrical power is delivered to the wireless tag component module 1424 from the battery module 1422.

In other embodiments, other methods or mechanisms may be instead or additionally used to access the battery module 1422 or other components of the wireless tag. For example, a modular wireless tag 1420 may be implemented to access one or more other components of the wireless tag, e.g., sensors, processors, circuitry, and the like. In another example, wireless tags may be placed into a chemical bath to strip epoxy or other adhesives to separate layers of the wireless tag such that the one or more components being renovated or recycled may be accessed. In another example, wireless tags may be heated to weaken adhesives. In another example, wireless tags may comprise cut or tear lines that, when cut or torn as indicated, expose one or more components of the wireless tag to be renovated or recycled. The cut or tear lines may be hidden using mechanical or design means such that they are not prematurely or accidentally cut or torn, e.g., using flaps, folds, or colored portions of the wireless tag.

Figure 15A:
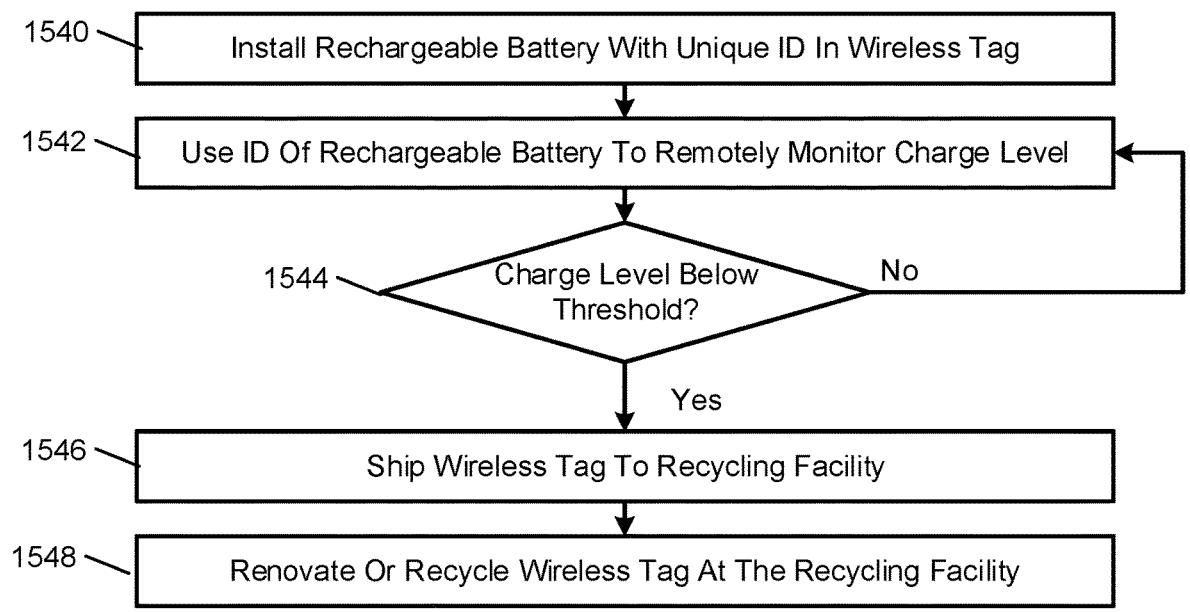
FIGS. 15A-15C show example flow diagrams of embodiments of a method of remotely monitoring the charge level of a wireless tag battery and issuing an alert to ship the wireless tag for renovation or recycling when the monitored battery level is below a threshold.

FIG. 15A is a flow diagram of an embodiment of a method 1500 of remotely monitoring the charge level of a wireless tag battery and issuing an alert to ship the wireless tag for renovation or recycling when the monitored battery level is below a threshold. In other embodiments, other metrics may additionally or instead be remotely monitored and alerts may be issued to ship the wireless tag for renovation or recycling when the other metrics are below a threshold. For example, the metrics may include performance of a processor or sensor, e.g., based on accuracy or frequency of data collection or processing operations. The alert may be transmitted to a human operator or user of the tracking system 700 and/or the wireless tag and displayed, for example, on a client device to the human operator or user. In accordance with this method, a rechargeable battery with a unique ID is installed in a wireless tag (FIG. 15A, block 1540.) The rechargeable battery may be an embodiment of the flexible rechargeable battery 1270 shown in FIG. 12A or the rechargeable battery 1280 shown in FIG. 12B. The rechargeable battery may, for example, comprise terminals that connect to an external power source through a wired connection, may comprise an internal radio frequency energy receiver that converts received external radio frequency energy into electrical energy, or may be a separate modular component configured to attach to and detach from one or more electrical components of the wireless tag (e.g., the battery module 1422 shown in FIGS. 14A and 14B).

The wireless tag is then deployed in the field and may perform various functions. For example, the wireless tag may be used to track an asset. In further examples, the wireless tag is attached to an asset and tracks the location of the asset during shipment. In some examples, the wireless tag includes sensors that gather environmental information for an asset. The wireless tag may also communicate wirelessly with other nodes of the wireless tracking system 700. While performing the various functions, the wireless tag may use energy stored in its battery. The wireless tag wirelessly communicates the current battery level of its rechargeable battery and the unique ID of its rechargeable battery to other nodes of the wireless tracking system (e.g., the server(s) 704). The wireless tag may communicate the current battery level and the unique ID at a fixed time interval (e.g., every 3 hours), according to some embodiments. In other embodiments, the wireless tag communicates the current battery level and the unique ID, when the battery level falls below a threshold value. In further embodiments, there are multiple threshold values for the battery level, and the wireless tag communicates the current battery level and the unique ID each time the battery level falls below one of the multiple threshold values. In other embodiments, the wireless tag communicates the current battery level and the unique ID, in response to receiving an inquiry or communication from another node of the wireless tracking system 700. For example, the server(s) 704 may transmit to the wireless tag a request for an update on the battery level of the wireless tag.

The charge level of the rechargeable battery is remotely monitored by the wireless tracking system 700 using the received battery level and unique battery identifier (FIG. 15A, block 1542). If the charge level is above a threshold charge level, the wireless tracking system 700 continues to remotely monitor the charge level of the rechargeable battery (FIG. 15A, block 1544). For example, the wireless tracking system 700 may request updates on the battery level of the wireless tag at a fixed frequency. In other embodiments, the wireless tracking system 700 may instruct the wireless tag to transmit its current battery level and unique ID of its rechargeable battery to another node of the wireless tracking system at a fixed frequency. The other node of the wireless tracking system may relay the current battery level and unique ID to the server(s) 704. In some embodiments, the other node is one of the server(s) 704 and the wireless tag transmits it directly (e.g., via cellular communication). If the charge level is at or below the threshold charge level, the wireless tracking system transmits a notification to ship the wireless tag to a recycling facility (FIG. 15A, block 1546). The notification may be transmitted to a user (e.g., via a user interface on a client device). In some embodiments, if the wireless tag is currently in use for performing some function (e.g., tracking an asset) when its charge level falls below the threshold level, the user is notified to replace the wireless tag with another wireless tag charge level above the threshold. The replacement wireless tag then continues performing the same function in place of the wireless tag that is shipped to the recycling facility.

In some embodiments, the wireless tracking system additionally transmits a notification to the wireless tag. In some embodiments, the wireless tag is configured to detect an end of journey and to determine that the wireless tag will be shipped to a recycling facility, e.g., based on identification of a geofence associated with a destination location, based on a current battery level, based on sensor data associated with receipt by an end customer. Responsive to receiving the notification or determining an end of journey, the wireless tag enters a hibernation or recycling mode to conserve available battery levels or functionality of electronics. For example, the hibernation or recycling mode may include one or more of: reducing a frequency of outgoing communications; reducing an amount of sensor data collected, processed, or transmitted; turning off one or more long-range communications capabilities; and the like. The hibernation or recycling mode may allow the wireless tag to conserve the remaining energy in its battery and perform functions in support of returning the wireless tag to a recycling facility. For example, in the hibernation or recycling mode, the wireless tag may track its own location and transmit its current location at a lower frequency than when in use for tracking an asset.

The user then ships the wireless tag to the recycling facility. At the recycling facility, the wireless tag is renovated or recycled (FIG. 15A, block 1549). In some embodiments, for example, the rechargeable battery is recharged wirelessly, through a wired connection, or by converting received external radio frequency energy into electrical energy. In some embodiments, the battery is removed from the wireless tag for renovation and the renovated battery is connected to electronic components of a new or refurbished wireless tag using spot-welding or other means. In other embodiments, other types of rechargeable batteries and methods of recharging or renovation may be used, as described above, with respect to FIGS. 12A and 12B. In other embodiments, the wireless tag is an embodiment of the wireless tag 1420 shown in FIGS. 14A and 14B, and the battery module 1422 is replaced at the recycling facility during the renovating or recycling step (FIG. 15A, block 1549). In other embodiments, one or more other electronic components of the wireless tag, such as sensors, processors, and the like, are renovated or recycled at the recycling facility. For example, a wireless antenna may be replaced at the recycling facility, if it is determined that the wireless antenna is malfunctioning or the wireless antenna's performance is below a threshold level (e.g., signal strength or accuracy).

In other embodiments, the method of claim 15 may comprise additional, fewer, or different steps, and the steps may be performed in a different order. In some embodiments, one or more of the steps may be executed by other entities of the wireless tracking system.

Figure 15B:
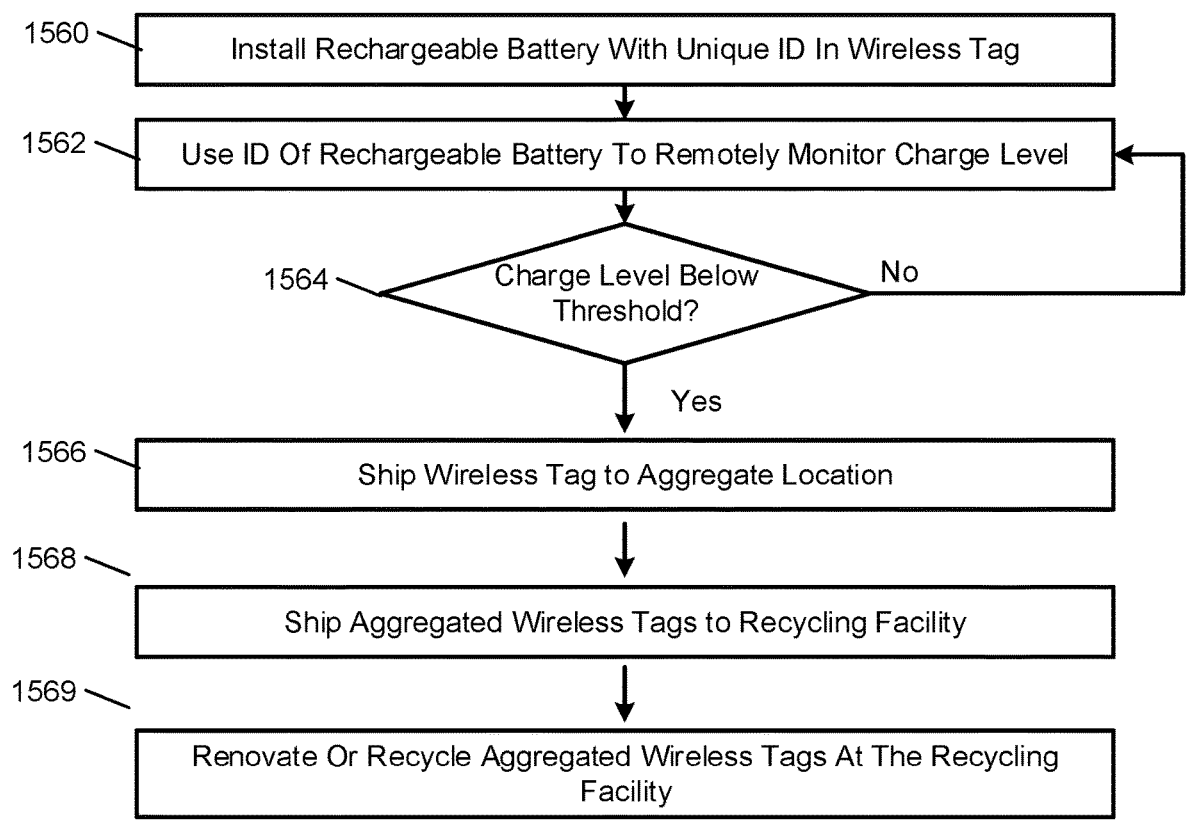

FIG. 15B is a flow diagram of an embodiment of a method 1501 of remotely monitoring the charge level of a wireless tag battery and issuing an alert to ship the wireless tag for renovation or recycling when the monitored battery level is below a threshold. The method 1501 is an alternate embodiment of the method 1500. In other embodiments, other metrics may additionally or instead be remotely monitored and alerts may be issued to ship the wireless tag for renovation or recycling when the other metrics are below a threshold. For example, the metrics may include performance of a processor or sensor, e.g., based on accuracy or frequency of data collection or processing operations. Similar to the method 1500, a rechargeable battery with a unique ID is installed in a wireless tag (FIG. 15B, block 1560.) The wireless tag is then deployed in the field and may perform various functions. For example, the wireless tag may be used to track an asset. The charge level of the rechargeable battery is remotely monitored by the wireless tracking system 700 by receiving the battery level and the unique battery identifier (FIG. 15B, block 1562) from the wireless tag, as described above with respect to FIG. 15A. If the charge level is above a threshold charge level, the wireless tracking system 700 continues to remotely monitor the charge level of the rechargeable battery (FIG. 15, B block 1566). If the charge level is at or below the threshold charge level, the wireless tracking system transmits a notification to ship the wireless tag to an aggregate location (FIG. 15B, block 1546). The notification may be transmitted to a user (e.g., via a user interface on a client device). In some embodiments, the wireless tag includes the address of the aggregate location printed or otherwise displayed on the wireless tag, such as with the wireless tag 112. Steps 1560, 1562, 1564, and 1566 are substantially similar to the respective steps 1540, 1542, 1544, and 1546 shown in FIG. 15A, with the exception that the wireless tag is shipped to an aggregate location, instead of a recycling facility.

At the aggregate location, wireless tags that have a charge level below the threshold are aggregated and prepared for shipment to the recycling facility. In this case, multiple wireless tags with low charge level are collected and shipped 1568 together to the recycling facility from the aggregate location, instead of being individually shipped directly to the recycling facility by users. This may improve efficiency of tracking, collecting, and shipping the wireless tags to the recycling facility for recycling and/or renovation. In further embodiments, diagnostics or other processing of the wireless tags is performed at the aggregate location. For example, the charge level of each wireless tag may be checked to validate the charge level detected during remote monitoring 1562.

The aggregated wireless tags are shipped (FIG. 15B, block 1568) to the recycling facility. At the recycling facility, the aggregated tags are renovated or recycled (FIG. 15B, block 1569) as discussed above with respect to FIG. 15A, block 1548.

Figure 15C:
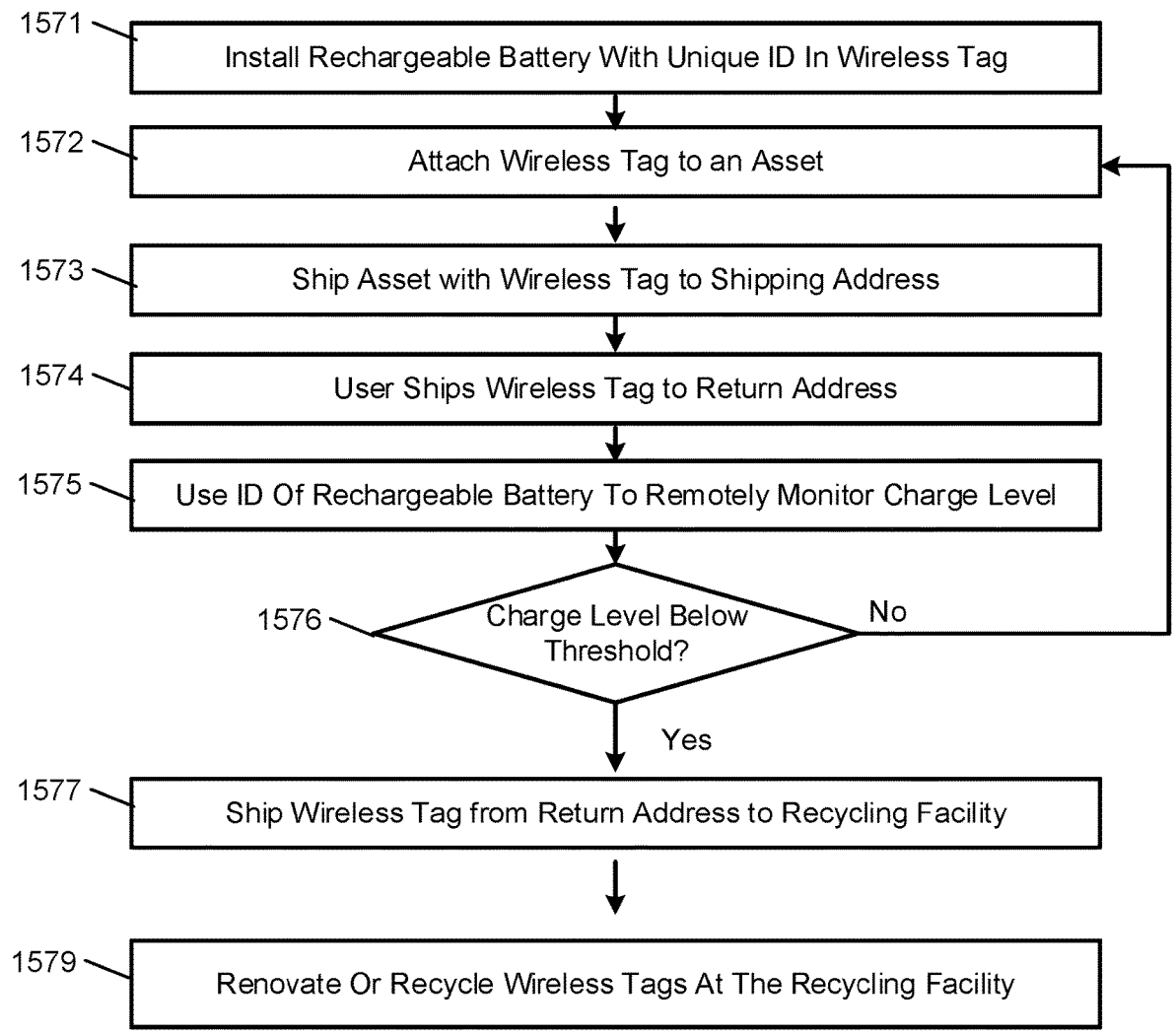

FIG. 15C is a flow diagram of an embodiment of a method 1502 of remotely monitoring the charge level of a wireless tag battery and issuing an alert to ship the wireless tag for renovation or recycling when the monitored battery level is below a threshold. The method 1502 is an alternate embodiment of the method 1500. In other embodiments, other metrics may additionally or instead be remotely monitored and alerts may be issued to ship the wireless tag for renovation or recycling when the other metrics are below a threshold. For example, the metrics may include performance of a processor or sensor, e.g., based on accuracy or frequency of data collection or processing operations. Similar to the method 1500, a rechargeable battery with a unique ID is installed in a wireless tag (FIG. 15C, block 1571.) The wireless tag is then deployed in the field and may perform various functions. In this example, the wireless tag is used to track an asset during delivery of the asset and is attached (FIG. 15C, block 1572) to the asset. For example, the wireless tag may be attached 1572 using a transparent sleeve as shown in FIGS. 1A-1C.

The asset with the wireless tag is then shipped (FIG. 15C, 1573) to a user (e.g., a customer or end-user) at a shipping address. In some embodiments, the wireless tag includes instructions for the user, such as the instructions shown in FIGS. 1A-1C. The instructions may include those for shipping the wireless tag to a return address after the asset has been delivered to the user. Once the asset is received at the shipping address, the user ships the wireless tag to a return address (FIG. 15C, 1574). In some embodiments, the wireless tag includes the return address printed or otherwise displayed on the wireless tag, such as with the wireless tag 112

After the wireless tag has been delivered to the return address, the charge level of the rechargeable battery is remotely monitored by the wireless tracking system 700 by receiving the battery level and the unique battery identifier (FIG. 15C, block 1575) from the wireless tag, as described above with respect to FIG. 15A. In other embodiments, the charge level and unique battery identifier are determined at the return address by a user or system located at the return address. In this case, the charge level and unique battery identifier may be transmitted by the user or system to the wireless tracking system 700.

If the charge level is above a threshold charge level, the wireless tag is attached to a new asset and used to track the new asset (FIG. 15, B block 1576), repeating the steps 1572, 1573, 1574, 1575, and 1576. If the wireless tag includes the shipping address for assets it is tracking displayed on the wireless tag, the wireless tag may be modified before the new asset is shipped. For example, the shipping address may be on a sticker or label that is on the wireless tag. The sticker or label may be replaced or covered with a new sticker or label that has the new shipping address for the new asset. Other modifications may be made to the wireless tag before it is reused for the new asset, according to some embodiments.

If the charge level is at or below the threshold charge level, the wireless tracking system transmits a notification to ship the wireless tag to a recycling facility (FIG. 15C, block 1576). The notification may be transmitted to a human operator (e.g., via a user interface on a client device) at the return address. The wireless tag is then shipped (FIG. 15C, block 1577) to the recycling facility. The wireless tag may be shipped with a plurality of wireless tags that need renovation or recycling, as described above with respect to FIG. 15B The wireless tag is renovated or recycled at the recycling facility, as described above with respect to FIG. 15A, block 1548.

Figure 16A:
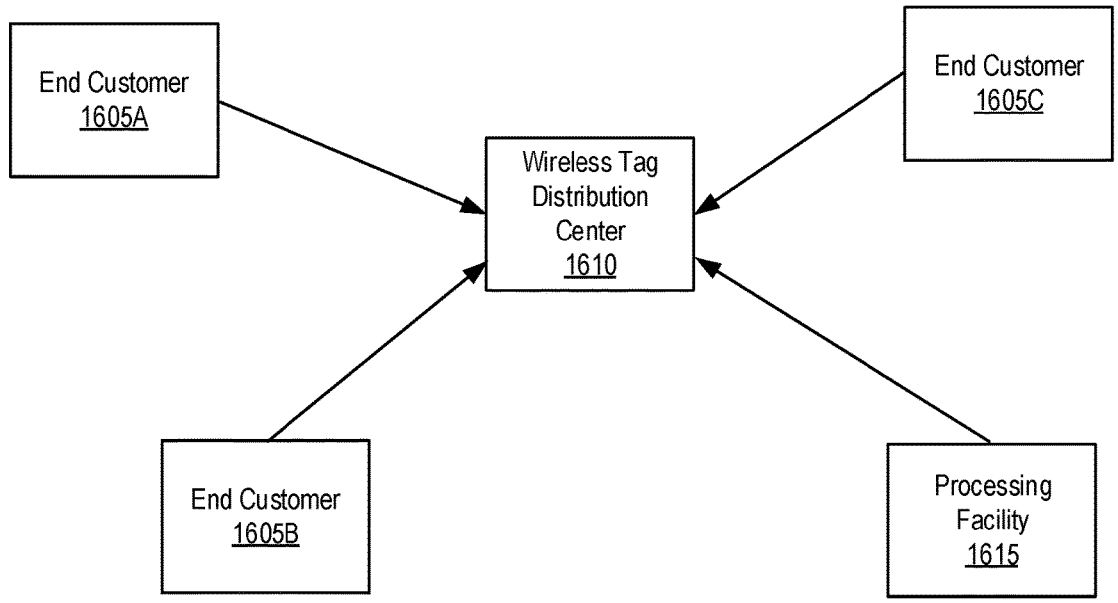
FIGS. 16A-16C are block diagrams of aggregation points for renovating or recycling wireless tags.
Figure 16B:
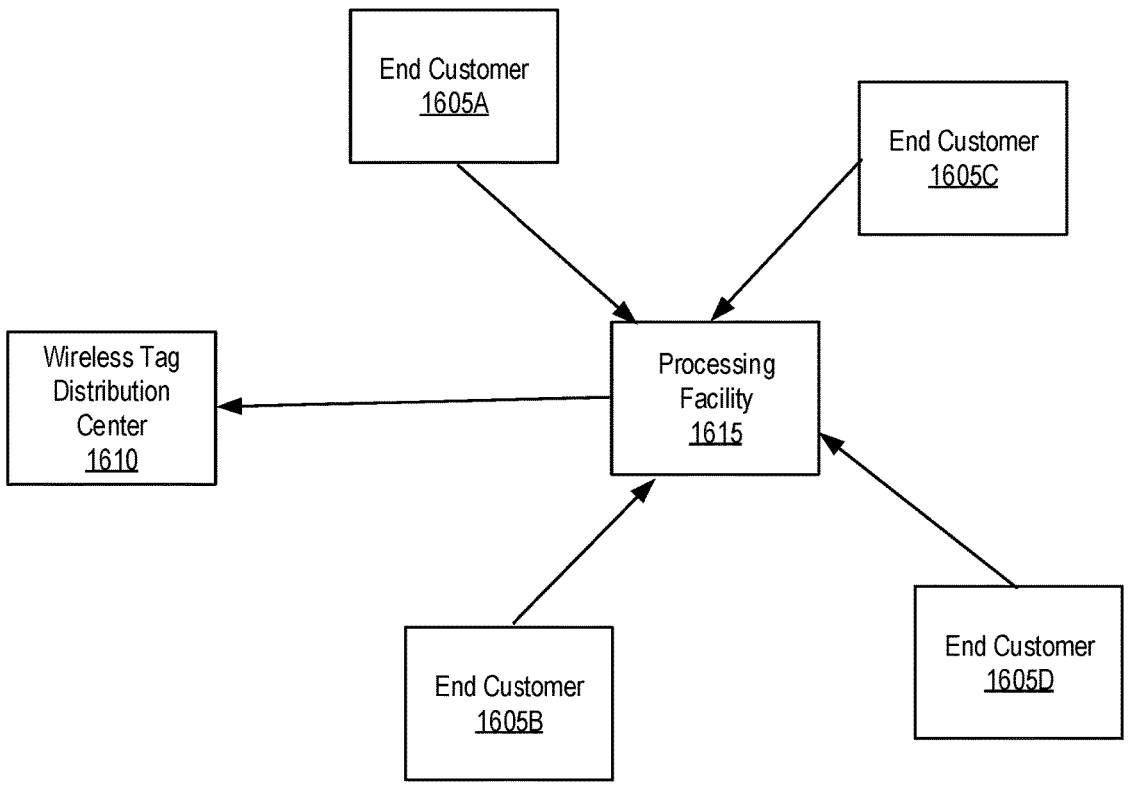
Figure 16C:
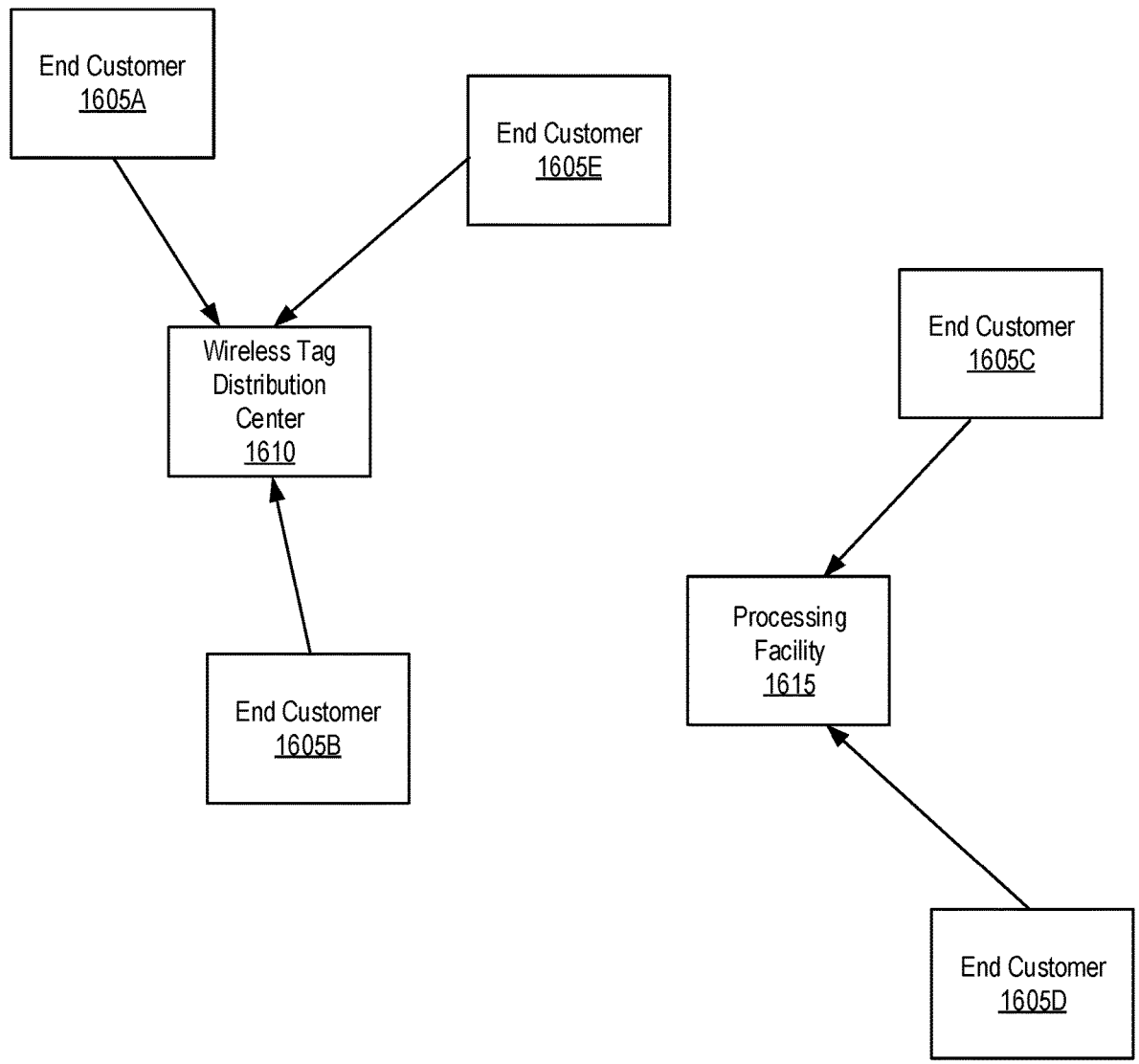

FIGS. 16A-16C are block diagrams of aggregation points for renovating or recycling wireless tags. End customers 1605A-C, processing facilities 1615, and wireless tag distribution facilities 1610 are locations associated with one or more stages or phases of asset movement. For example, the wireless tag distribution center 1610 is an origin location for a plurality of wireless tags and/or for a plurality of assets, e.g., a manufacturing plant or storage facility. Processing facilities 1615 may be, for example, an intermediate transport or delivery service, e.g., UPS or USPS, and end customers 1605A-C are one or more destination locations of assets. In some embodiments, wireless tag distribution centers 1610 or processing facilities 1615 may have means for renovating or recycling wireless tags. In other environments, there may be more, different, or fewer end customers 1605, processing facilities 1615, and wireless tag distribution centers 1610 than shown in FIGS. 16A-16C.

In the embodiment of FIG. 16A, one or more end customers 1605A, 1605B, 1605C and a processing facility 1615 release respective wireless tags to be shipped to the wireless tag distribution center 1610. In some embodiments, the one or more end customers 1605A, 1605B, 1605C receive an asset including a wireless tag, remove the wireless tag from the asset, and release the wireless tag to be shipped to the wireless tag distribution center 1610 to be renovated or recycled. In some embodiments, the processing facility 1615 removes one or more wireless tags from respective assets and releases the one or more wireless tags to be shipped to the wireless tag distribution center 1610 to be renovated or recycled. For example, the processing facility 1615 may remove wireless tags from respective assets immediately prior to loading the assets for delivery to end customers 1605, enabling the processing facility to aggregate and release large numbers of wireless tags to the wireless tag distribution center 1610.

In the embodiment of FIG. 16B, one or more end customers 1605A, 1605B, 1605C, 1605D release respective wireless tags to be shipped to a processing facility 1615. The processing facility aggregates the received wireless tags. In some embodiments, the processing facility 1615 additionally aggregates one or more wireless tags associated with other assets (e.g., removed from assets by the processing facility prior to shipping assets to end customers 1605). The processing facility 1615 then releases the aggregated wireless tags to be shipped to the wireless tag distribution center 1610 to be renovated or recycled.

In the embodiment of FIG. 16C, a processing facility 1615 has a means for renovating or recycling wireless tags. A first set of end customers 1605A, 1605B, 1605E remove respective wireless tags from assets and release the respective wireless tags to a wireless tag distribution center 1610 to be renovated or recycled. A second set of end customers 1605C, 1605D remove respective wireless tags from assets and release the respective wireless tags to the processing facility 1615 to be renovated or recycled. In some embodiments, the first and second sets of end customers 1605 are determined based at least in part on one or more of: Relative locations of end customers to the wireless tag distribution center 1610 and processing facility 1615; throughput of renovation or recycling of the wireless tag distribution center 1610 and processing facility 1615; shipping costs of wireless tags to the wireless tag distribution center 1610 and the processing facility 1615; aggregation of sets of wireless tags at the wireless tag distribution center 1610 and the processing facility 1615; methods for renovation or recycling available at the wireless tag distribution center 1610 and the processing facility 1615; and a number or type of asset in need of wireless tags or wireless tag components at the wireless tag distribution center 1610 and the processing facility 1615. In other embodiments, other factors may be used to determine the sets of end customers 1605.

Computer Apparatus

Figure 17:
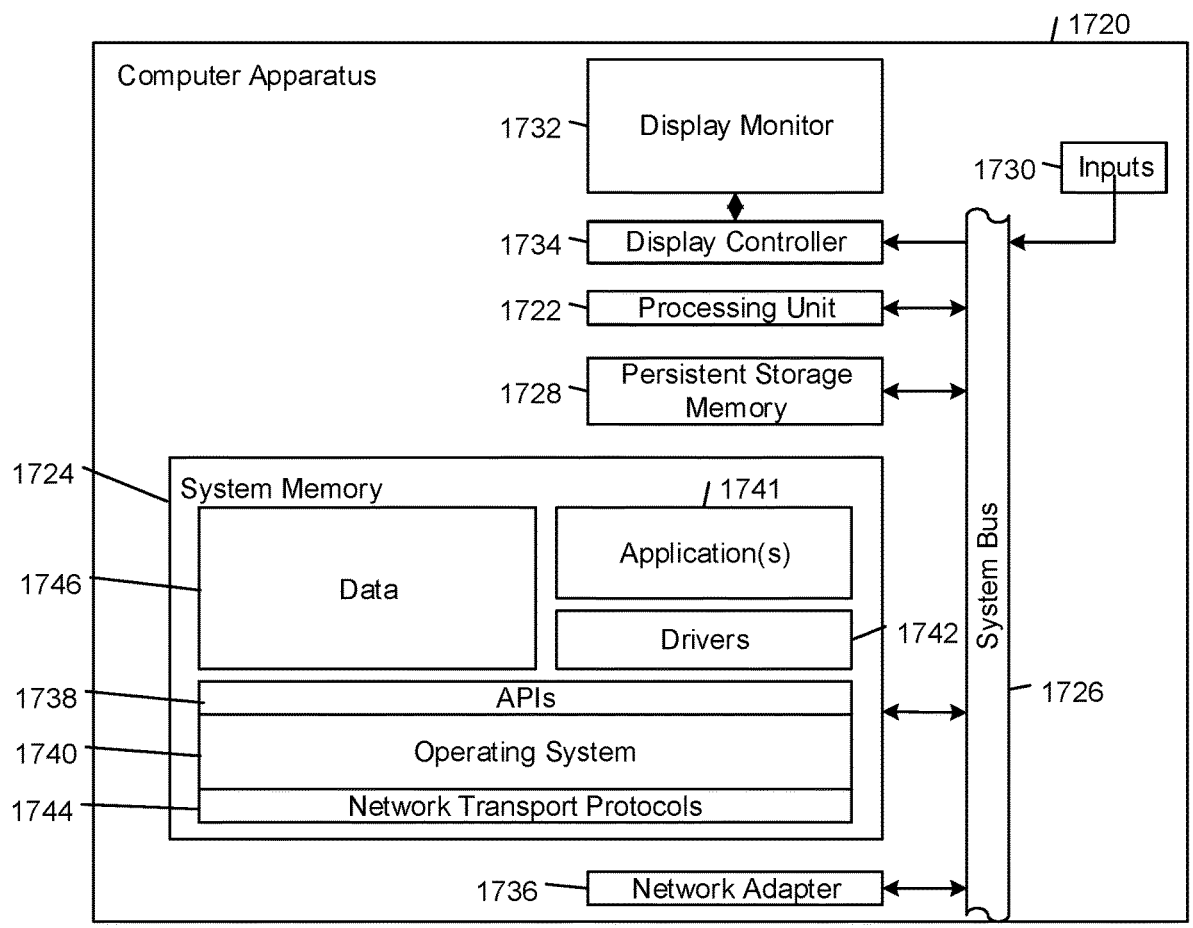
FIG. 17 is a block diagram of an example computer apparatus.

FIG. 17 shows an example embodiment of computer apparatus that is configured to implement one or more of the computing systems described in this specification. The computer apparatus 1720 includes a processing unit 1722, a system memory 1724, and a system bus 1726 that couples the processing unit 1722 to the various components of the computer apparatus 1720. The processing unit 1722 may include one or more data processors, each of which may be in the form of any one of various commercially available computer processors. The system memory 1724 includes one or more computer-readable media that typically are associated with a software application addressing space that defines the addresses that are available to software applications. The system memory 1724 may include a read only memory (ROM) that stores a basic input/output system (BIOS) that contains start-up routines for the computer apparatus 1720, and a random access memory (RAM). The system bus 1726 may be a memory bus, a peripheral bus or a local bus, and may be compatible with any of a variety of bus protocols, including PCI, VESA, Microchannel, ISA, and EISA. The computer apparatus 1720 also includes a persistent storage memory 1728 (e.g., a hard drive, a floppy drive, a CD ROM drive, magnetic tape drives, flash memory devices, and digital video disks) that is connected to the system bus 1726 and contains one or more computer-readable media disks that provide non-volatile or persistent storage for data, data structures and computer-executable instructions.

A user may interact (e.g., input commands or data) with the computer apparatus 1720 using one or more input devices 1730 (e.g. one or more keyboards, computer mice, microphones, cameras, joysticks, physical motion sensors, and touch pads). Information may be presented through a graphical user interface (GUI) that is presented to the user on a display monitor 1732, which is controlled by a display controller 1734. The computer apparatus 1720 also may include other input/output hardware (e.g., peripheral output devices, such as speakers and a printer). The computer apparatus 1720 connects to other network nodes through a network adapter 1736 (also referred to as a "network interface card" or NIC).

A number of program modules may be stored in the system memory 1724, including application programming interfaces 1738 (APIs), an operating system (OS) 1740 (e.g., the Windows® operating system available from Microsoft Corporation of Redmond, Washington U.S.A.), software applications 1741 including one or more software applications programming the computer apparatus 1720 to perform one or more of the steps, tasks, operations, or processes of the hierarchical classification systems described herein, drivers 1742 (e.g., a GUI driver), network transport protocols 1744, and data 1746 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

What is claimed is:

1. A wireless tag comprising:
a wireless communication system;
a processor coupled to the wireless communications system;
instructions displayed on the wireless tag that guide the user of the wireless tag to release the wireless tag to a delivery service to be delivered to a return address after the asset has arrived at a shipping address and that guide the user to remove the wireless tag from a sleeve on an asset and to reinsert the wireless tag into the sleeve wherein a back side of the wireless tag is visible through the sleeve before releasing the wireless tag to a delivery service,
wherein the back side of the wireless tag comprises the return address;
an energy source coupled to the processor and the wireless communications system;
at least one non-transitory processor-readable medium comprising instructions which, when executed by the processor, configures the processor to perform operations comprising processing data, storing the processed data, and controlling the wireless communication system to transmit wireless messages,
wherein the wireless tag is configured to track an asset during delivery to the shipping address.

2. The wireless tag of claim 1, further comprising a pictogram on a front side of the wireless tag depicting a series of steps comprising removing the wireless tag from the sleeve and reinserting the wireless tag into the sleeve such that the back side of the wireless tag visible through the sleeve.

3. The wireless tag of claim 1, wherein the energy source is a rechargeable battery comprising terminals that connect to an external power source through a wired connection.

4. The wireless tag of claim 1, wherein the energy source is a rechargeable battery comprising an internal radio frequency energy receiver that converts received external radio frequency energy into electrical energy.

5. The wireless tag of claim 1, wherein the energy source is a rechargeable battery comprising a separate modular component that is configured to attach to and detach from one or more electrical components of the asset.

6. The wireless tag of claim 1, wherein the wireless communication system includes a Global Positioning System (GPS) transceiver system configured to communicate with a GPS satellite.

7. The wireless tag of claim 1, the wireless tag further comprising a sensor operable to generate data characterizing an environmental state of the asset in response to exposure to external stimulus.

8. A method of recycling a wireless tag, the method comprising:
receiving an asset carrying a wireless tag at a shipping address, the wireless tag comprising:
a back side comprising the shipping address and a return address;
a front side comprising instructions to remove the wireless tag from a sleeve on the asset and reinsert the wireless tag into the sleeve so that the back side of the wireless tag is visible through the sleeve before releasing the wireless tag to a delivery service; and
one or more electronic components;
removing the wireless tag from the sleeve on the asset and reinserting the wireless tag into the sleeve so that the back side of the wireless tag is visible through sleeve;
releasing the wireless tag to the delivery service;
receiving the wireless tag at the return address; and
renovating, at a renovation facility corresponding to the return address, at least one of the one or more electronic components in the wireless tag.

9. The method of claim 8, wherein the one or more electronic components comprises a rechargeable battery, the method comprising:
removing the rechargeable battery from the wireless tag; and after renovating the rechargeable battery, incorporating the rechargeable battery in another wireless tag.

10. The method of claim 9, wherein the renovating comprises recharging the rechargeable battery wirelessly.

11. The method of claim 10, wherein the recharging comprises receiving electrical energy converted from a radio frequency energy converter that converts external radio frequency energy received wirelessly into electrical energy.

12. The method of claim 9, wherein the renovating comprises connecting an external power source to terminals of the rechargeable battery through a wired connection.

13. The method of claim 9, wherein
the wireless tag comprises a modular component comprising the rechargeable battery and configured to attach and detach from the one or more electrical components of the wireless tag, and
the renovating comprises removing the modular component by detaching the modular component from the one or more electrical components of the wireless tag, and installing another modular component comprising another charged rechargeable battery by attaching the other modular component to the one or more electrical components of the wireless tag.

14. The method of claim 8, further comprising:
removing at least one of the one or more electronic components from the wireless tag; and
after renovating the at least one electronic component, incorporating the one or more renovated electronic components in another wireless tag.

15. A method comprising:
remotely monitoring, by a wireless tracking system, a performance of one or more electronic components of a wireless tag, the wireless tag associated with an asset and configured to wirelessly communicate with the wireless tracking system, wherein the one or more electronic components comprises a rechargeable battery;
receiving, by the wireless tracking system, a wireless communication comprising a charge level of the rechargeable battery;
determining, by the wireless tracking system, that a performance level of the one or more electronic components is below a threshold level based at least in part on the received charge level of the rechargeable battery; and
transmitting, by the wireless system, a notification to a user to ship the wireless tag to a return address for renovation or recycling.

16. The method of claim 15, wherein the remotely monitoring the charge level of the rechargeable battery comprises wirelessly receiving a unique identifier of the rechargeable battery.

17. The method of claim 15, wherein: the rechargeable battery is a separate modular component that is configured to attach to and detach from one or more electrical components of the wireless tag, and the renovation or recycling of the wireless tag comprises: removing the rechargeable battery from the wireless tag by detaching the separate modular component from the one or more electrical components; and installing another rechargeable battery in the wireless tag that has a charge level above the threshold level by attaching the rechargeable battery to the one or more electrical components.

18. The method of claim 15, wherein the one or more electronic components comprises one or more of: a sensor, a processor, a communications system, a circuit or set of circuits.

19. The method of claim 18, wherein the renovation or recycling of the wireless tag comprises:
removing the one or more electronic components of the wireless tag; and
installing one or more replacement electronic components in the wireless tag, the one or more replacement electronic components having a performance level about the threshold value, by connecting the one or more replacement electronic components to other components of the wireless tag.

* * * * *